US012456791B2

(12) United States Patent
Tokuda et al.

(10) Patent No.: US 12,456,791 B2

(45) Date of Patent: Oct. 28, 2025

(54) DIRECTIONAL COUPLER, RADIO-FREQUENCY MODULE, AND COMMUNICATION DEVICE

(71) Applicant: Murata Manufacturing Co., Ltd., Kyoto (JP)

(72) Inventors: Daisuke Tokuda, Kyoto (JP); Ryangsu Kim, Kyoto (JP); Yuuta Miyazaki, Kyoto (JP); Naoya Akashi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 184 days.

(21) Appl. No.: 18/449,909

(22) Filed: Aug. 15, 2023

(65) Prior Publication Data

US 2024/0072407 A1 Feb. 29, 2024

(30) Foreign Application Priority Data

Aug. 26, 2022 (JP) ................................ 2022-135410

(51) Int. Cl.
*H01P 5/18* (2006.01)

(52) U.S. Cl.
CPC .................................. *H01P 5/188* (2013.01)

(58) Field of Classification Search
CPC .. H01P 5/18; H01P 5/185; H01P 5/184; H01P 5/187; H01P 1/24; H01P 1/2039; H01P 5/188; H01P 1/10; H01P 5/04; H01P 1/213; H01P 1/15; H01P 3/02; H01P 3/08; H01P 5/16; H01P 1/184; H01P 5/12; H01P 1/18; H01P 1/20363; H01P 1/2135; H01P 3/00; H01P 7/082; H01P 1/203; H01P 11/003; H01P 5/183; H01P 1/182; H01P 1/185; H01P 1/20345; H01P 1/218; H01P 5/08; H01P 5/107; H01P 5/19

See application file for complete search history.

(56) References Cited

U.S. PATENT DOCUMENTS

| | | | | |
|---|---|---|---|---|
| 10,804,955 | B2 * | 10/2020 | Sakurai .................... | H04B 1/48 |
| 2011/0057746 | A1 * | 3/2011 | Yamamoto ................ | H01P 5/18 333/116 |
| 2017/0310355 | A1 * | 10/2017 | Hayakawa ............... | H04B 1/44 |

(Continued)

FOREIGN PATENT DOCUMENTS

| | | | |
|---|---|---|---|
| JP | 2020-155798 | A | 9/2020 |
| JP | 2021-027426 | A | 2/2021 |
| WO | 2020/129892 | A1 | 6/2020 |

*Primary Examiner* — John W Poos

(74) *Attorney, Agent, or Firm* — McDonald Hopkins LLC

(57) ABSTRACT

A directional coupler includes a first main line, a second main line, first sub-lines, second sub-lines, a first output terminal, a second output terminal, a first inductor, and a second inductor. The first output terminal is configured to be coupled to the first sub-lines. The first output terminal is configured to output a first detection signal corresponding to a first radio-frequency signal transferred through the first main line. The second output terminal is configured to be coupled to the second sub-lines. The second output terminal is configured to output a second detection signal corresponding to a second radio-frequency signal transferred through the second main line. The first inductor is provided in a first signal path including the first output terminal. The second inductor is provided in a second signal path including the second output terminal.

18 Claims, 10 Drawing Sheets

(56) References Cited

U.S. PATENT DOCUMENTS

| | | | | |
|---|---|---|---|---|
| 2018/0102752 | A1* | 4/2018 | Kishimoto | H01P 1/2002 |
| 2019/0140336 | A1* | 5/2019 | Ootsuka | H01P 1/24 |
| 2021/0036396 | A1 | 2/2021 | Seki et al. | |
| 2021/0234247 | A1 | 7/2021 | Tokuda et al. | |
| 2022/0140462 | A1 | 5/2022 | Sugawara et al. | |

* cited by examiner

DIRECTIONAL COUPLER, RADIO-FREQUENCY MODULE, AND COMMUNICATION DEVICE

CROSS REFERENCE TO RELATED APPLICATION

This application claims priority from Japanese Patent Application No. 2022-135410 filed on Aug. 26, 2022. The content of this application is incorporated herein by reference in its entirety.

BACKGROUND OF THE DISCLOSURE

1. Field of the Disclosure

The present disclosure generally relates to directional couplers, radio-frequency modules, and communication devices. In particular, the present disclosure relates to a directional coupler including a main line and a sub-line, a radio-frequency module including the directional coupler, and a communication device including the radio-frequency module.

2. Description of the Related Art

Japanese Unexamined Patent Application Publication No. 2021-27426 (Patent Document 1) describes a directional coupler including a main line, two sub-lines, and three coupling terminals. Each of the two sub-lines has a line length corresponding to particular frequencies of the detected signal. The directional coupler according to Patent Document 1 selects one coupling terminal from the three coupling terminals and outputs a detection signal from the selected coupling terminal.

BRIEF SUMMARY OF THE DISCLOSURE

The directional coupler according to Patent Document 1 is not able to simultaneously output multiple detection signals.

A possible benefit of the present disclosure is to provide a directional coupler, a radio-frequency module, and a communication device that are able to simultaneously output multiple detection signals.

A directional coupler according to an aspect of the present disclosure includes a first main line, a second main line, a first sub-line, a second sub-line, a first output terminal, a second output terminal, a first inductor, and a second inductor. The first sub-line is configured to be electromagnetically coupled to the first main line. The second sub-line is configured to be electromagnetically coupled to the second main line. The first output terminal is configured to be coupled to the first sub-line. The first output terminal is configured to output a first detection signal corresponding to a first radio-frequency signal transferred through the first main line. The second output terminal is configured to be coupled to the second sub-line. The second output terminal is configured to output a second detection signal corresponding to a second radio-frequency signal transferred through the second main line. The first inductor is provided in a first signal path including the first output terminal. The second inductor is provided in a second signal path including the second output terminal.

A directional coupler according to another aspect of the present disclosure includes a main line, a sub-line, a first output terminal, a second output terminal, a first inductor, and a second inductor. The sub-line is configured to be electromagnetically coupled to the main line. The first output terminal is configured to be coupled to the sub-line. The first output terminal is configured to output a first detection signal corresponding to a radio-frequency signal transferred through the main line. The second output terminal is configured to output a second detection signal from outside. The first inductor is provided in a first signal path including the first output coupling terminal. The second inductor is provided in a second signal path including the second output terminal.

A radio-frequency module according to an aspect of the present disclosure includes the directional coupler described above and a filter. The filter is coupled to the directional coupler. The filter is configured to pass a radio-frequency signal in a predetermined frequency band.

A communication device according to an aspect of the present disclosure includes the radio-frequency module described above and a signal processing circuit. The signal processing circuit is coupled to the radio-frequency module.

The directional coupler according to an aspect of the present disclosure, the radio-frequency module according to an aspect of the present disclosure, and the communication device according to an aspect of the present disclosure enable the simultaneous output of multiple detection signals.

DETAILED DESCRIPTION OF THE DISCLOSURE

Figure 1:
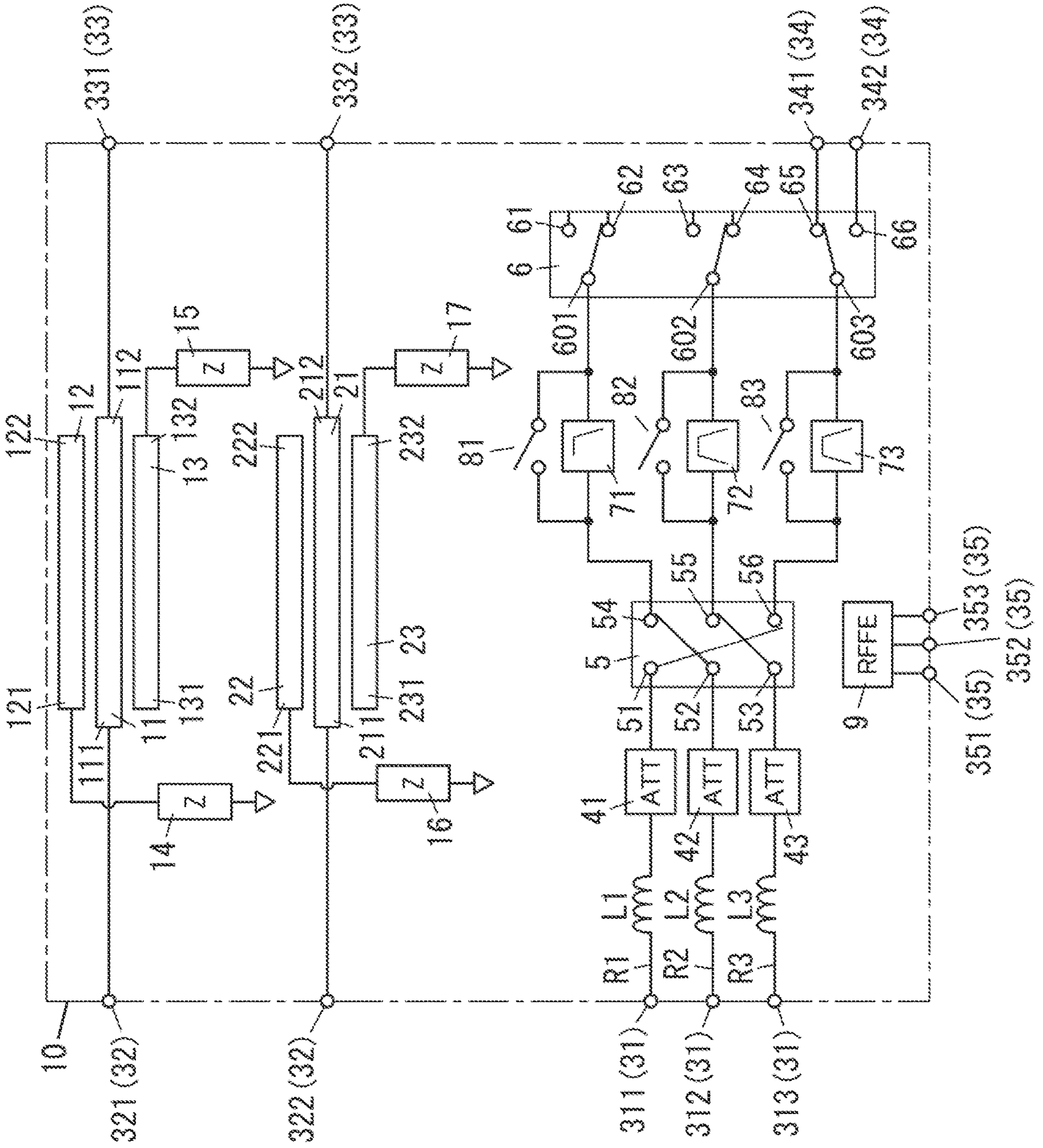
FIG. 1 is a circuit diagram of a directional coupler according to a first embodiment.

FIGS. 3 and 5 to 7, which are referred to in the following embodiments and modifications, are all schematic drawings, and the proportion of the size and thickness of each constituent element in the drawings is not necessarily identical to the corresponding proportion in actual measurements.

First Embodiment

A directional coupler 10 according to a first embodiment includes, as illustrated in FIG. 1, a first main line 11, a second main line 21, first sub-lines 12 and 13, second sub-lines 22 and 23, a first output terminal (an output terminal 312 in the example in FIG. 1), a second output terminal (an output terminal 313 in the example in FIG. 1), a first inductor (an inductor L2 in the example in FIG. 1), and a second inductor (an inductor L3 in the example in FIG. 1). The directional coupler 10 according to the first embodiment further includes a third output terminal (an output terminal 311 in the example in FIG. 1) and a third inductor (an inductor L1 in the example in FIG. 1).

The first sub-lines 12 and 13 are electromagnetically coupleable to the first main line 11. The second sub-lines 22 and 23 are electromagnetically coupleable to the second main line 21. The first output terminal is coupleable to the first sub-lines 12 and 13. The first output terminal is a terminal for outputting a first detection signal corresponding to a first radio-frequency signal transferred through the first main line 11. The second output terminal is coupleable to the second sub-lines 22 and 23. The second output terminal is a terminal for outputting a second detection signal corresponding to a second radio-frequency signal transferred through the second main line 21. The first inductor is provided in a first signal path (a signal path R2 in the example in FIG. 1) including the first output terminal. The second inductor is provided in a second signal path (a signal path R3 in the example in FIG. 1) including the second output terminal. The third output terminal is coupleable to an external input terminal 341 or 342. The third output terminal is a terminal for outputting a detection signal inputted from outside (for example, from another directional coupler) through the external input terminal 341 or 342. The third inductor is provided in a third signal path (a signal path R1 in the example in FIG. 1) including the third output terminal.

Because the directional coupler 10 according to the first embodiment includes the first to third output terminals, the directional coupler 10 is able to simultaneously output the first detection signal, the second detection signal, and the detection signal from outside. In other words, the directional coupler 10 according to the first embodiment is able to simultaneously output multiple detection signals.

1 Directional Coupler, Radio-Frequency Module, and Communication Device 1.1 Configuration of Radio-Frequency Module Firstly, a configuration of a radio-frequency module 100 according to the first embodiment will be described with reference to FIG. 2.

Figure 2:
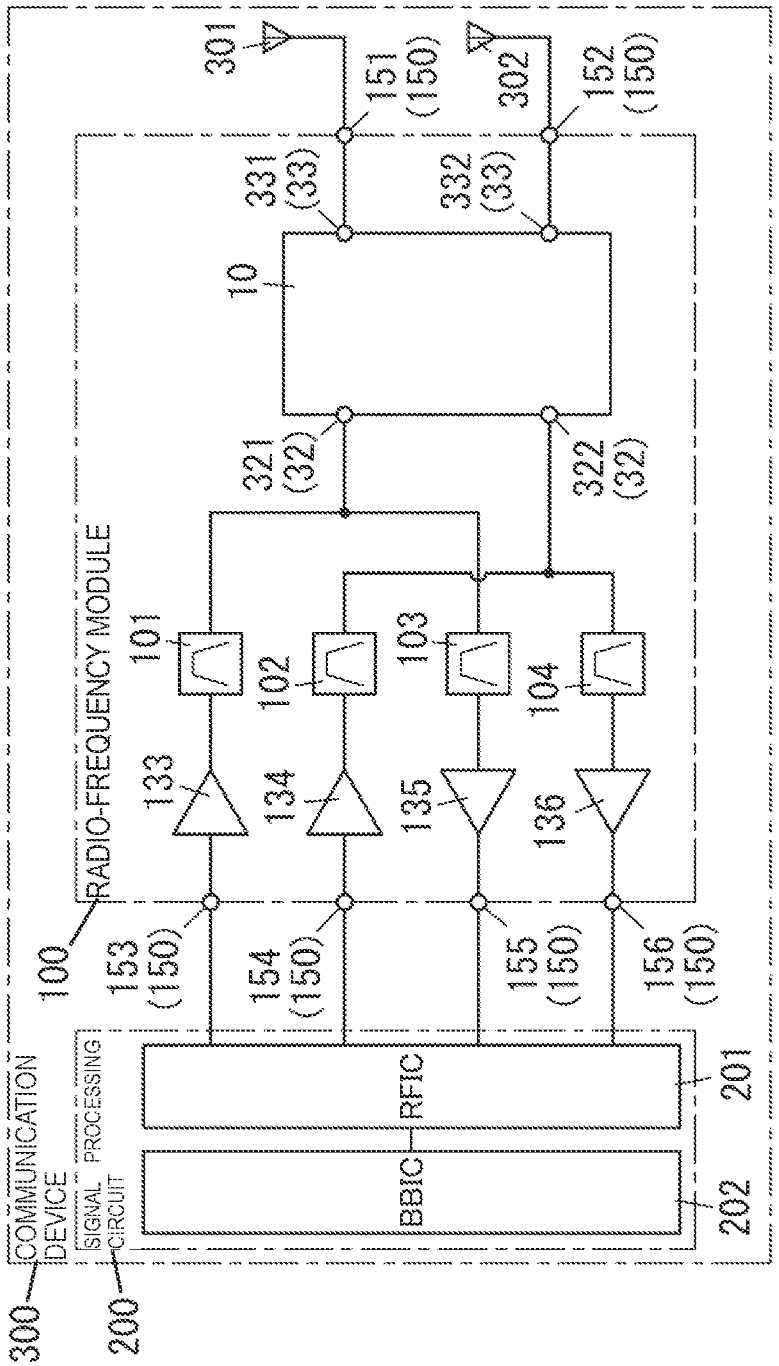
FIG. 2 is a circuit diagram of a radio-frequency module and communication device including the directional coupler.

The radio-frequency module 100 is used, as illustrated in FIG. 2, in a communication device 300, for example a smartphone. The communication device 300 may be, for example, a wearable device such as a smartwatch. The radio-frequency module 100 can support technology standards such as the fourth generation (4G) and fifth generation (5G) technology standards for cellular networks. Examples of the 4G standards include the 3rd Generation Partnership Project (3GPP) (registered trademark) Long-Term Evolution (LTE) (registered trademark) standard. Examples of the 5G standards include 5G New Radio (NR). The radio-frequency module 100 enables, for example, carrier aggregation and dual connectivity. In one example, the radio-frequency module 100 enables dual uplink carrier aggregation, in which two frequency bands are simultaneously used for uplink.

The communication device 300 is operable to transmit the transmit signals in multiple communication bands and receive the receive signals in multiple communication bands. The transmit and receive signals in multiple communication bands are, for example, frequency division duplex (FDD) signals. The transmit and receive signals in multiple communication bands are not limited to FDD signals and may be time division duplex (TDD) signals. FDD is a wireless communication technology in which different frequency bands are assigned to transmission and reception in wireless communication to perform the transmission and reception operations. TDD is a wireless communication technology in which the same frequency band is assigned to transmission and reception in wireless communication, and the operation is switched between the transmission and reception operations in each time slot.

The radio-frequency module 100 includes, as illustrated in FIG. 2, the directional coupler 10, a first transmit filter 101, a second transmit filter 102, a first receive filter 103, and a second receive filter 104. The radio-frequency module 100 further includes a first power amplifier 133, a second power amplifier 134, a first low-noise amplifier 135, and a second low-noise amplifier 136. The radio-frequency module 100 further includes multiple external connection terminals 150. The radio-frequency module 100 further includes a first output matching circuit (not illustrated in the drawing), a second output matching circuit (not illustrated in the drawing), a first input matching circuit (not illustrated in the drawing), and a second input matching circuit (not illustrated in the drawing). The directional coupler 10 will be described in detail in the section "(1.3) Configuration of directional coupler".

1.1.1 Power Amplifier

The first power amplifier 133 is an amplifier for amplifying a transmit signal in, for example, a first communication band. The first power amplifier 133 is provided in the signal path between the first transmit filter 101 and a first signal input terminal 153 described later. The first power amplifier 133 includes a first input terminal (not illustrated in the drawing) and a first output terminal (not illustrated in the drawing). The first input terminal of the first power amplifier 133 is coupled to an external circuit (for example, a signal processing circuit 200) via the first signal input terminal 153. The first output terminal of the first power amplifier 133 is coupled to the first transmit filter 101. The first power amplifier 133 is controllable by, for example, a controller (not illustrated in the drawing). The first power amplifier 133 may be directly or indirectly coupled to the first transmit filter 101. In the first embodiment, the first power amplifier 133 is coupled to the first transmit filter 101 indirectly via the first output matching circuit (not illustrated in the drawing).

The second power amplifier 134 is an amplifier for amplifying a transmit signal in, for example, a second communication band that is different from the first communication band. The second communication band includes, for example, frequencies lower than the first communication band. The second power amplifier 134 is provided in the signal path between the second transmit filter 102 and a second signal input terminal 154 described later. The second power amplifier 134 includes a second input terminal (not illustrated in the drawing) and a second output terminal (not illustrated in the drawing). The second input terminal of the second power amplifier 134 is coupled to an external circuit (for example, the signal processing circuit 200) via the second signal input terminal 154. The second output terminal of the second power amplifier 134 is coupled to the second transmit filter 102. The second power amplifier 134 is controllable by, for example, the controller. The second power amplifier 134 may be directly or indirectly coupled to the second transmit filter 102. In the first embodiment, the second power amplifier 134 is coupled to the second transmit filter 102 indirectly via the second output matching circuit (not illustrated in the drawing).

1.1.2 Filter

The first transmit filter 101 is a band pass filter configured such that the pass band is a transmit band of, for example, the first communication band. The first transmit filter 101 is provided in the signal path between the first output terminal of the first power amplifier 133 and an input-output terminal 321 of the directional coupler 10 described later. The second transmit filter 102 is a band pass filter configured such that the pass band is a transmit band of, for example, the second communication band. The second transmit filter 102 is provided in the signal path between the second output terminal of the second power amplifier 134 and an input-output terminal 322 of the directional coupler 10 described later.

The first receive filter 103 is a band pass filter configured such that the pass band is a receive band of, for example, the first communication band. The first receive filter 103 is provided in the signal path between the first low-noise amplifier 135 described later and the input-output terminal 321. The second receive filter 104 is a band pass filter configured such that the pass band is a receive band of, for example, the second communication band. The second receive filter 104 is provided in the signal path between the second low-noise amplifier 136 described later and the input-output terminal 322.

Overall, the radio-frequency module 100 according to the first embodiment is coupled to the directional coupler 10, and the radio-frequency module 100 includes filters (the first transmit filter 101, the second transmit filter 102, the first receive filter 103, and the second receive filter 104) that pass radio-frequency signals in predetermined frequency bands (the first communication band and the second communication band).

1.1.3 Output Matching Circuit

The first output matching circuit (not illustrated in the drawing) is provided in the signal path between the first output terminal of the first power amplifier 133 and the first transmit filter 101. The first output matching circuit is a circuit for providing the impedance matching between the first power amplifier 133 and the first transmit filter 101. The first output matching circuit has, for example, a configuration including one inductor. The inductor of the first output matching circuit is provided on the output side with respect to the first power amplifier 133. The configuration of the first output matching circuit is not limited to the configuration including one inductor; the first output matching circuit may have, for example, a configuration including multiple inductors or a configuration including multiple inductors and multiple capacitors.

The second output matching circuit (not illustrated in the drawing) is provided in the signal path between the second output terminal of the second power amplifier 134 and the second transmit filter 102. The second output matching circuit is a circuit for providing the impedance matching between the second power amplifier 134 and the second transmit filter 102. The second output matching circuit has, for example, a configuration including one inductor. The inductor of the second output matching circuit is provided on the output side with respect to the second power amplifier 134. The configuration of the second output matching circuit is not limited to the configuration including one inductor; the second output matching circuit may have, for example, a configuration including multiple inductors or a configuration including multiple inductors and multiple capacitors.

1.1.4 Low-Noise Amplifier

The first low-noise amplifier 135 is an amplifier for amplifying with low noise a receive signal in, for example, the first communication band. The first low-noise amplifier 135 is provided in the signal path between the first receive filter 103 and a first signal output terminal 155 described later. The first low-noise amplifier 135 includes a first input terminal (not illustrated in the drawing) and a first output terminal (not illustrated in the drawing). The first input terminal of the first low-noise amplifier 135 is coupled to the first input matching circuit (not illustrated in the drawing). The first output terminal of the first low-noise amplifier 135 is coupled to an external circuit (for example, the signal processing circuit 200) via the first signal output terminal 155.

The second low-noise amplifier 136 is an amplifier for amplifying with low noise a receive signal in, for example, the second communication band. The second low-noise amplifier 136 is provided in the signal path between the second receive filter 104 and a second signal output terminal 156 described later. The second low-noise amplifier 136 includes a second input terminal (not illustrated in the drawing) and a second output terminal (not illustrated in the drawing). The second input terminal of the second low-noise amplifier 136 is coupled to the second input matching circuit (not illustrated in the drawing). The second output terminal of the second low-noise amplifier 136 is coupled to an external circuit (for example, the signal processing circuit 200) via the second signal output terminal 156.

1.1.5 Input Matching Circuit

The first input matching circuit (not illustrated in the drawing) is provided in the signal path between the first low-noise amplifier 135 and the first receive filter 103. The first input matching circuit is a circuit for providing the impedance matching between the first low-noise amplifier 135 and the first receive filter 103. The first input matching circuit has, for example, a configuration including one inductor. The inductor of the first input matching circuit is provided on the input side with respect to the first low-noise amplifier 135. The configuration of the first input matching circuit is not limited to the configuration including one inductor; the first input matching circuit may have, for example, a configuration including multiple inductors or a configuration including multiple inductors and multiple capacitors.

The second input matching circuit (not illustrated in the drawing) is provided in the signal path between the second low-noise amplifier 136 and the second receive filter 104. The second input matching circuit is a circuit for providing the impedance matching between the second low-noise amplifier 136 and the second receive filter 104. The second input matching circuit has, for example, a configuration including one inductor. The inductor of the second input matching circuit is provided on the input side with respect to the second low-noise amplifier 136. The configuration of the second input matching circuit is not limited to the configuration including one inductor; the second input matching circuit may have, for example, a configuration including multiple inductors or a configuration including multiple inductors and multiple capacitors.

1.1.6 External Connection Terminal

The external connection terminals 150 include a first antenna terminal 151, a second antenna terminal 152, the first signal input terminal 153, the second signal input terminal 154, the first signal output terminal 155, the second signal output terminal 156, and multiple ground terminals (not illustrated in the drawing). The multiple ground terminals are electrically coupled to a ground electrode of a circuit board described later (not illustrated in the drawing) included in the communication device 300 so that a ground potential is supplied to the multiple ground terminals.

The first antenna terminal 151 is coupled to a first antenna 301. In the radio-frequency module 100, the first antenna terminal 151 is coupled to an input-output terminal 331 described later of the directional coupler 10. The first antenna terminal 151 is coupled to the first transmit filter 101 and the first receive filter 103 through the first main line 11 of the directional coupler 10.

The second antenna terminal 152 is coupled to a second antenna 302. In the radio-frequency module 100, the second antenna terminal 152 is coupled to an input-output terminal 332 described later of the directional coupler 10. The second antenna terminal 152 is coupled to the second transmit filter 102 and the second receive filter 104 through the second main line 21 of the directional coupler 10.

The first signal input terminal 153 and the second signal input terminal 154 are terminals for inputting transmit signals from an external circuit (for example, the signal processing circuit 200) to the radio-frequency module 100. In the radio-frequency module 100, the first signal input terminal 153 is coupled to the first power amplifier 133. In the radio-frequency module 100, the second signal input terminal 154 is coupled to the second power amplifier 134.

The first signal output terminal 155 is a terminal for outputting a receive signal from the first low-noise amplifier 135 to an external circuit (for example, the signal processing circuit 200). In the radio-frequency module 100, the first signal output terminal 155 is coupled to the first low-noise amplifier 135. The second signal output terminal 156 is a terminal for outputting a receive signal from the second low-noise amplifier 136 to an external circuit (for example, the signal processing circuit 200). In the radio-frequency module 100, the second signal output terminal 156 is coupled to the second low-noise amplifier 136.

The multiple ground terminals (not illustrated in the drawing) are electrically coupled to a ground electrode of the circuit board (not illustrated in the drawing) included in the communication device 300 so that a ground potential is supplied to the multiple ground terminals. In the radio-frequency module 100, the multiple ground terminals are coupled to a ground layer (not illustrated in the drawing) of a mounting board (not illustrated in the drawing). The ground layer serves as the circuit ground of the radio-frequency module 100.

1.2 Configuration of Communication Device

The following describes a configuration of the communication device 300 according to the first embodiment with reference to FIG. 2.

The communication device 300 includes, as illustrated in FIG. 2, the radio-frequency module 100 described above, the first antenna 301, the second antenna 302, and the signal processing circuit 200. The communication device 300 further includes a circuit board (not illustrated in the drawing) on which the radio-frequency module 100 is mounted. The circuit board is, for example, a printed-circuit board. The circuit board has a ground electrode to which a ground potential is supplied.

1.2.1 Antenna

The first antenna 301 is coupled to the first antenna terminal 151 of the radio-frequency module 100. The second antenna 302 is coupled to the second antenna terminal 152 of the radio-frequency module 100. The first antenna 301 and the second antenna 302 have a transmit function of sending as radio waves the transmit signals outputted from the radio-frequency module 100 and a receive function of receiving the receive signals as radio waves from outside and outputting the receive signals to the radio-frequency module 100.

1.2.2 Signal Processing Circuit

The signal processing circuit 200 is coupled to the radio-frequency module 100. The signal processing circuit 200 is operable to process signals transferred through the radio-frequency module 100 or to be transferred through the radio-frequency module 100. More specifically, the signal processing circuit 200 is operable to process transmit signals and receive signals. The signal processing circuit 200 includes a radio-frequency (RF) signal processing circuit 201 and a baseband signal processing circuit 202.

The RF signal processing circuit 201 is, for example, a radio frequency integrated circuit (RFIC). The RF signal processing circuit 201 is operable to process radio-frequency signals.

The RF signal processing circuit 201 processes by, for example, upconversion a signal outputted by the baseband signal processing circuit 202 and outputs the processed radio-frequency signal to the radio-frequency module 100. The RF signal processing circuit 201 also processes by, for example, downconversion a radio-frequency signal outputted by the radio-frequency module 100 and outputs the processed signal to the baseband signal processing circuit 202.

The baseband signal processing circuit 202 is, for example, a baseband integrated circuit (BBIC). The baseband signal processing circuit 202 is operable to perform a predetermined signal processing operation on transmit signals from the outside of the signal processing circuit 200. The receive signal processed by the baseband signal processing circuit 202 is used as, for example, an image signal for image display or a sound signal for calls.

The RF signal processing circuit 201 also functions as a control unit for controlling the connections of switches 5 and 6 and short circuiting switches 81 to 83 of the directional coupler 10, which will be described later, in response to transmitting or receiving a radio-frequency signal (a transmit signal or receive signal). Specifically, the RF signal processing circuit 201 controls the connections of the switches 5 and 6 and the short circuiting switches 81 to 83 of the directional coupler 10 based on a control signal (not illustrated in the drawing). The control unit may be provided outside the RF signal processing circuit 201; for example, the control unit may be provided in the radio-frequency module 100 or the baseband signal processing circuit 202.

1.3 Configuration of Directional Coupler

The following describes a configuration of the directional coupler 10 according to the first embodiment with reference to FIG. 1.

The directional coupler 10 includes, as illustrated in FIG. 1, the first main line 11, the first sub-lines 12 and 13, the second main line 21, the second sub-lines 22 and 23, and termination circuits 14 to 17. The directional coupler 10 further includes multiple first connection terminals 31, multiple second connection terminals 32, multiple third connection terminals 33, multiple fourth connection terminals 34, and multiple fifth connection terminals 35. The directional coupler 10 further includes the inductors L1 to L3, attenuators 41 to 43, and the switches 5 and 6. The directional coupler 10 further includes filters 71 to 73, the short circuiting switches 81 to 83, and an RF frond-end (RFFE) 9.

1.3.1 Main Line

The first main line 11 has a first end 111 and a second end 112 that are opposite ends of the first main line 11 in the length direction of the first main line 11. The first end 111 of the first main line 11 is coupled to the input-output terminal 321 described later. The first end 111 of the first main line 11 is coupled via the input-output terminal 321 to the first transmit filter 101 and the first receive filter 103 (see FIG. 2). The second end 112 of the first main line 11 is coupled to the input-output terminal 331 described later. The second end 112 of the first main line 11 is coupled via the input-output terminal 331 to the first antenna terminal 151 (see FIG. 2).

The second main line 21 is a main line different from the first main line 11. More specifically, the second main line 21 is a main line through which radio-frequency signals in a frequency band different from the first main line 11 pass. Specifically, the frequency band of radio-frequency signals passing through the first main line 11 is the first communication band, and the frequency band of radio-frequency signals passing through the second main line 21 is the second communication band. The second main line 21 has a first end 211 and a second end 212 that are opposite ends of the second main line 21 in the length direction of the second main line 21. The first end 211 of the second main line 21 is coupled to the input-output terminal 322 described later. The first end 211 of the second main line 21 is coupled via the input-output terminal 322 to the second transmit filter 102 and the second receive filter 104 (see FIG. 2). The second end 212 of the second main line 21 is coupled to the input-output terminal 332 described later. The second end 212 of the second main line 21 is coupled via the input-output terminal 332 to the second antenna terminal 152 (see FIG. 2).

1.3.2 Sub-Line

The first sub-line 12 has a first end 121 and a second end 122 that are opposite ends of the first sub-line 12 in the length direction of the first sub-line 12. The first end 121 of the first sub-line 12 is coupled to the termination circuit 14. The second end 122 of the first sub-line 12 is coupled to a selection terminal 61 described later of the switch 6, which is not illustrated in the drawing. The first sub-line 12 is electromagnetically coupleable to the first main line 11. The line length of the first sub-line 12 corresponds to, for example, frequencies in the first communication band. The first sub-line 12 obtains a detection signal corresponding to a transmit signal in the first communication band while the transmit signal passes through the first main line 11.

The first sub-line 13 has a first end 131 and a second end 132 that are opposite ends of the first sub-line 13 in the length direction of the first sub-line 13. The first end 131 of the first sub-line 13 is coupled to a selection terminal 62 of the switch 6, which is not illustrated in the drawing. The second end 132 of the first sub-line 13 is coupled to the termination circuit 15. The first sub-line 13 is electromagnetically coupleable to the first main line 11. The line length of the first sub-line 13 corresponds to frequencies different from the frequencies of the first communication band. More specifically, the line length of the first sub-line 13 is different from the line length of the first sub-line 12. The first sub-line 13 obtains a detection signal corresponding to a transmit signal, for example, at a frequency different from the first communication band while the transmit signal passes through the first main line 11.

The second sub-line 22 has a first end 221 and a second end 222 that are opposite ends of the second sub-line 22 in the length direction of the second sub-line 22. The first end 221 of the second sub-line 22 is coupled to the termination circuit 16. The second end 222 of the second sub-line 22 is coupled to a selection terminal 63 of the switch 6, which is not illustrated in the drawing. The second sub-line 22 is electromagnetically coupleable to the second main line 21. The line length of the second sub-line 22 corresponds to, for example, frequencies in the second communication band. The second sub-line 22 obtains a detection signal corresponding to a transmit signal in the second communication band while the transmit signal passes through the second main line 21.

The second sub-line 23 has a first end 231 and a second end 232 that are opposite ends of the second sub-line 23 in the length direction of the second sub-line 23. The first end 231 of the second sub-line 23 is coupled to a selection terminal 64 of the switch 6, which is not illustrated in the drawing. The second end 232 of the second sub-line 23 is coupled to the termination circuit 17. The second sub-line 23 is electromagnetically coupleable to the second main line 21. The line length of the second sub-line 23 corresponds to frequencies different from the frequencies of the second communication band. More specifically, the line length of the second sub-line 23 is different from the line length of the second sub-line 22. The second sub-line 23 obtains a detection signal corresponding to a transmit signal, for example, at a frequency different from the second communication band while the transmit signal passes through the second main line 21.

In the first embodiment, a radio-frequency signal (a transmit signal) transferred through the first main line 11 is the first radio-frequency signal, and a detection signal obtained by one of the first sub-lines 12 and 13 is the first detection signal. Also, in the first embodiment, a radio-frequency signal (a transmit signal) transferred through the second main line 21 is the second radio-frequency signal, and a detection signal obtained by one of the second sub-lines 22 and 23 is the second detection signal.

1.3.3 Termination Circuit

The termination circuit 14 is a circuit for ending the first sub-line 12 described above. The termination circuit 14 is coupled between the first end 121 of the first sub-line 12 and the ground. The termination circuit 15 is a circuit for ending the first sub-line 13 described above. The termination circuit 15 is coupled between the second end 132 of the first sub-line 13 and the ground. The termination circuit 16 is a circuit for ending the second sub-line 22 described above. The termination circuit 16 is coupled between the first end 221 of the second sub-line 22 and the ground. The termination circuit 17 is a circuit for ending the second sub-line 23 described above. The termination circuit 17 is coupled between the second end 232 of the second sub-line 23 and the ground.

Each of the termination circuits 14 to 17 includes, for example, a variable resistor (not illustrated in the drawing), a variable capacitor (not illustrated in the drawing), and a switch (not illustrated in the drawing). The switch is coupled between the variable resistor and the ground. The variable capacitor is coupled in parallel with the variable resistor. By turning on or off the switch of each of the termination circuits 14 to 17, the corresponding sub-line switches between the state in which the sub-line is terminated and the state in which the sub-line is not terminated.

1.3.4 Inductor

The inductor L1 is provided in the signal path R1 connecting the output terminal 311 described later and a first terminal 51 of the switch 5. More specifically, the inductor L1 is provided in the signal path between the output terminal 311 and the attenuator 41 of the signal path R1. A first end of the inductor L1 is coupled to the output terminal 311. A second end of the inductor L1 is coupled to the attenuator 41.

The inductor L2 is provided in the signal path R2 connecting the output terminal 312 described later and a second terminal 52 of the switch 5. More specifically, the inductor L2 is provided in the signal path between the output terminal 312 and the attenuator 42 of the signal path R2. A first end of the inductor L2 is coupled to the output terminal 312. A second end of the inductor L2 is coupled to the attenuator 42.

The inductor L3 is provided in the signal path R3 connecting the output terminal 313 described later and a third terminal 53 of the switch 5. More specifically, the inductor L3 is provided in the signal path between the output terminal 313 and the attenuator 43 of the signal path R3. A first end of the inductor L3 is coupled to the output terminal 313. A second end of the inductor L3 is coupled to the attenuator 43.

1.3.5 Attenuator

The attenuator 41 is provided in the signal path between the inductor L1 and the first terminal 51 of the switch 5 of the signal path R1. The attenuator 41 is operable to attenuate the detection signal passing through the signal path R1 to change the signal level of the detection signal to a predetermined signal level.

The attenuator 42 is provided in the signal path between the inductor L2 and the second terminal 52 of the switch 5 of the signal path R2. The attenuator 42 is operable to attenuate the detection signal passing through the signal path R2 to change the signal level of the detection signal to a predetermined signal level.

The attenuator 43 is provided in the signal path between the inductor L3 and the third terminal 53 of the switch 5 of the signal path R3. The attenuator 43 is operable to attenuate the detection signal passing through the signal path R3 to change the signal level of the detection signal to a predetermined signal level.

1.3.6 Switch

The switch 5 is a switch for selectively coupling the first connection terminals 31 to different connection destinations. The switch 5 has first to sixth terminals 51 to 56. The first terminal 51 is coupled to the output terminal 311 described later via the inductor L1 and the attenuator 41. The second terminal 52 is coupled to the output terminal 312 described later via the inductor L2 and the attenuator 42. The third terminal 53 is coupled to the output terminal 313 described later via the inductor L3 and the attenuator 43. The fourth terminal 54 is coupled to a first parallel circuit consisting of the filter 71 and the short circuiting switch 81. The fifth terminal 55 is coupled to a second parallel circuit consisting of the filter 72 and the short circuiting switch 82. The sixth terminal 56 is coupled to a third parallel circuit consisting of the filter 73 and the short circuiting switch 83.

In the switch 5, the first terminal 51 is coupleable to the fourth terminal 54, the fifth terminal 55, or the sixth terminal 56. In the switch 5, the second terminal 52 is coupleable to the fourth terminal 54, the fifth terminal 55, or the sixth terminal 56. In the switch 5, the third terminal 53 is coupleable to the fourth terminal 54, the fifth terminal 55, or the sixth terminal 56.

In the example in FIG. 1, the first terminal 51 is coupled to the sixth terminal 56, the second terminal 52 is coupled to the fourth terminal 54, and the third terminal 53 is coupled to the fifth terminal 55. In this case, the inductor L2 is the first inductor, the output terminal 312 is the first output terminal, and the signal path R2 is the first signal path; also, the inductor L3 is the second inductor, the output terminal 313 is the second output terminal, and the signal path R3 is the second signal path; and also, the inductor L1 is the third inductor, the output terminal 311 is the third output terminal, and the signal path R1 is the third signal path.

For example, when the first terminal 51 is coupled to the fourth terminal 54, the second terminal 52 is coupled to the fifth terminal 55, and the third terminal 53 is coupled to the sixth terminal 56, the inductor L1 is the first inductor, the output terminal 311 is the first output terminal, and the signal path R1 is the first signal path; also, the inductor L2 is the second inductor, the output terminal 312 is the second output terminal, and the signal path R2 is the second signal path; and also, the inductor L3 is the third inductor, the output terminal 313 is the third output terminal, and the signal path R3 is the third signal path.

The switch 6 is operable to selectively couple the first parallel circuit to the first sub-line 12 or the first sub-line 13. The switch 6 is also operable to selectively couple the second parallel circuit to the second sub-line 22 or the second sub-line 23. The switch 6 is also operable to selectively couple the third parallel circuit to the external input terminal 341 or the external input terminal 342. The switch 6 has common terminals 601 to 603 and selection terminals 61 to 66.

The common terminal 601 is coupled to the first parallel circuit consisting of the filter 71 and the short circuiting switch 81. The common terminal 601 is coupled to the fourth terminal 54 of the switch 5 via the first parallel circuit. The common terminal 602 is coupled to the second parallel circuit consisting of the filter 72 and the short circuiting switch 82. The common terminal 602 is coupled to the fifth terminal 55 of the switch 5 via the second parallel circuit. The common terminal 603 is coupled to the third parallel circuit consisting of the filter 73 and the short circuiting switch 83. The common terminal 603 is coupled to the sixth terminal 56 of the switch 5 via the third parallel circuit.

The selection terminal 65 is coupled to the external input terminal 341 described later. The selection terminal 66 is coupled to the external input terminal 342 described later.

In the switch 6, the common terminal 601 is coupleable to the selection terminal 61 or the selection terminal 62. This means that the switch 6 selectively couples the first parallel circuit to the first sub-line 12 or the first sub-line 13. In the switch 6, the common terminal 602 is coupleable to the selection terminal 63 or the selection terminal 64. This means that the switch 6 selectively couples the second parallel circuit to the second sub-line 22 or the second sub-line 23. In the switch 6, the common terminal 603 is coupleable to the selection terminal 65 or the selection terminal 66. This means that the switch 6 selectively couples the third parallel circuit to the external input terminal 341 or the external input terminal 342. It may be possible that the common terminals 601 to 603 are coupleable to any others of the selection terminals 61 to 66.

The switches 5 and 6 described above are controllable by, for example, the RFFE 9 described later. More specifically, the connections in the switches 5 and 6 are changeable based on a control signal (not illustrated in the drawing) from the RFFE 9. The switch 6 has a mode in which the common terminal 601 is coupled to the selection terminal 61 or 62, and the common terminal 602 is coupled to the selection terminal 63 or 64. In the first embodiment, the common terminal 601 is a first common terminal, and the selection terminals 61 and 62 are a first selection terminal. In the first embodiment, the common terminal 602 is a second common terminal, and the selection terminals 63 and 64 are a second selection terminal.

1.3.7 Filter

The filter 71 is, for example, a low pass filter. The filters 72 and 73 are, for example, band pass filters. The filter 71 is provided in the signal path between the fourth terminal 54 of the switch 5 and the common terminal 601 of the switch 6. The filter 72 is provided in the signal path between the fifth terminal 55 of the switch 5 and the common terminal 602 of the switch 6. The filter 73 is provided in the signal path between the sixth terminal 56 of the switch 5 and the common terminal 603 of the switch 6. The filters 71 to 73 have a function of attenuating signals of unnecessary frequency components included in the detection signals from the common terminals 601 to 603 of the switch 6.

1.3.8 Short Circuiting Switch

The short circuiting switch 81 is a switch for short-circuiting the opposite ends of the filter 71. The short circuiting switch 81 is coupled in parallel with the filter 71. This means that the first parallel circuit consists of the short circuiting switch 81 and the filter 71. When the short circuiting switch 81 is off, the first detection signal inputted via the switch 6 passes through the filter 71. When the short circuiting switch 81 is on, the first detection signal inputted via the switch 6 passes through the short circuiting switch 81. The short circuiting switch 81 is controllable by, for example, the RFFE 9.

The short circuiting switch 82 is a switch for short-circuiting the opposite ends of the filter 72. The short circuiting switch 82 is coupled in parallel with the filter 72. This means that the second parallel circuit consists of the short circuiting switch 82 and the filter 72. When the short circuiting switch 82 is off, the second detection signal inputted via the switch 6 passes through the filter 72. When the short circuiting switch 82 is on, the second detection signal inputted via the switch 6 passes through the short circuiting switch 82. The short circuiting switch 82 is controllable by, for example, the RFFE 9.

The short circuiting switch 83 is a switch for short-circuiting the opposite ends of the filter 73. The short circuiting switch 83 is coupled in parallel with the filter 73. This means that the third parallel circuit consists of the short circuiting switch 83 and the filter 73. When the short circuiting switch 83 is off, a third detection signal (a detection signal from outside) inputted via the switch 6 passes through the filter 73. When the short circuiting switch 83 is on, the third detection signal inputted via the switch 6 passes through the short circuiting switch 83. The short circuiting switch 83 is controllable by, for example, the RFFE 9. The short circuiting switches 81 to 83 are turned on, so that the detection signals from the common terminals 601 to 603 of the switch 6 are outputted to the output terminals 311 to 313 without passing through the filters 71 to 73.

1.3.9 RFFE

The RFFE 9 is a control circuit for controlling radio-frequency signal processing between the first antenna 301 and the second antenna 302 (see FIG. 2) and the signal processing circuit 200 (see FIG. 2). The RFFE 9 is coupled to the signal processing circuit 200 via the fifth connection terminals 35. The fifth connection terminals 35 include, as described later, control terminals 351 to 353. The RFFE 9 receives control signals from the signal processing circuit 200 via the control terminals 351 to 353. The RFFE 9 controls the switches 5 and 6 and the short circuiting switches 81 to 83 based on these control signals.

1.3.10 Connection Terminal

The first connection terminals 31 include the output terminals 311 to 313. The output terminals 311 to 313 are terminals for outputting detection signals. In the example in FIG. 1, a detection signal from outside is outputted from the output terminal 311, the first detection signal is outputted from the output terminal 312, and the second detection signal is outputted from the output terminal 313.

The second connection terminals 32 include the input-output terminals 321 and 322. The input-output terminal 321 is coupled to the first transmit filter 101 and the first receive filter 103. The input-output terminal 321 functions as an input terminal for inputting transmit signals from the first transmit filter 101 to the directional coupler 10. The input-output terminal 321 also functions as an output terminal for outputting receive signals to the first receive filter 103. The input-output terminal 322 is coupled to the second transmit filter 102 and the second receive filter 104. The input-output terminal 322 functions as an input terminal for inputting transmit signals from the second transmit filter 102 to the directional coupler 10. The input-output terminal 322 also functions as an output terminal for outputting receive signals to the second receive filter 104.

The third connection terminals 33 include the input-output terminals 331 and 332. The input-output terminal 331 is coupled to the first antenna 301. The input-output terminal 321 functions as an output terminal for outputting transmit signals from the directional coupler 10 to the first antenna 301. The input-output terminal 321 also functions as an input terminal for inputting receive signals received by the first antenna 301 to the directional coupler 10. The input-output terminal 332 is coupled to the second antenna 302. The input-output terminal 332 functions as an output terminal for outputting transmit signals from the directional coupler 10 to the second antenna 302. The input-output terminal 332 also functions as an input terminal for inputting receive signals received by the second antenna 302 to the directional coupler 10.

The fourth connection terminals 34 include the external input terminals 341 and 342. The external input terminal 341 is coupled to an external circuit (for example, a first directional coupler as another directional coupler). The external input terminal 341 is a terminal for inputting detection signals from the first directional coupler to the directional coupler 10. The external input terminal 342 is coupled to an external circuit (for example, a second directional coupler as another directional coupler). The external input terminal 342 is a terminal for inputting detection signals from the second directional coupler to the directional coupler 10. In the first embodiment, a detection signal inputted from the external input terminal 341 or the external input terminal 342 is the third detection signal.

The fifth connection terminals 35 include the control terminals 351 to 353 as multiple (three in the example in FIG. 1) control terminals. The control terminals 351 to 353 are terminals for inputting control signals from an external circuit (for example, the signal processing circuit 200) to the directional coupler 10.

2 Layout of Inductors

Figure 3:
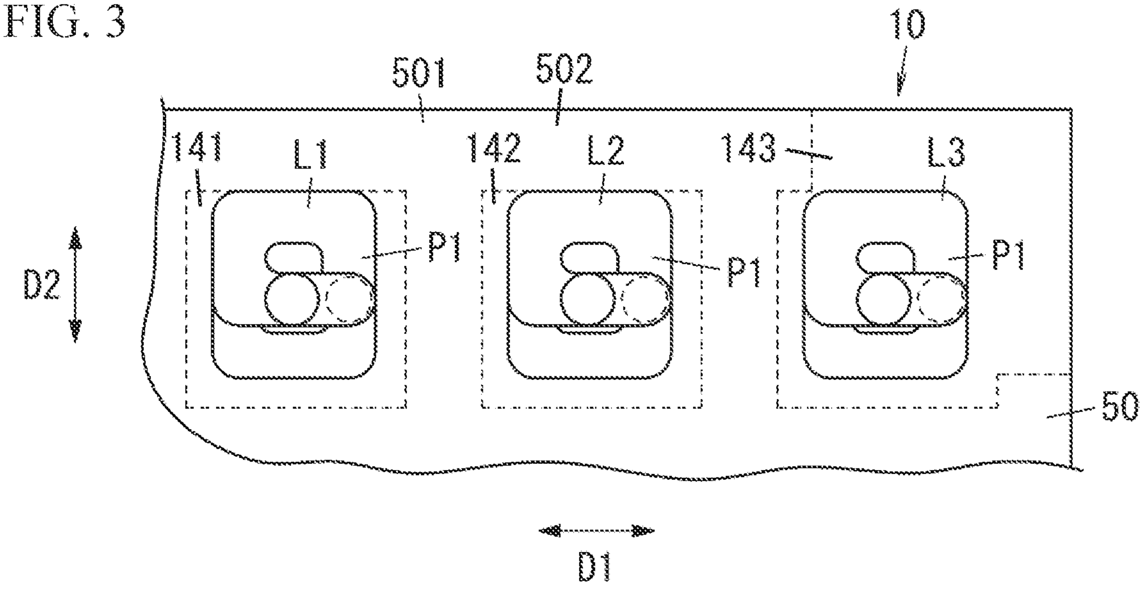
FIG. 3 is a partial enlargement of the directional coupler.

The following describes a layout of the inductors L1 to L3 with reference to FIG. 3.

The directional coupler 10 according to the first embodiment further includes, as illustrated in FIG. 3, a substrate 50. The substrate 50 has a first major surface 501 and a second major surface 502. The first major surface 501 and the second major surface 502 are opposite to each other in a direction perpendicular to a first direction D1 and a second direction D2 (the direction perpendicular to the drawing sheet of FIG. 3).

In the directional coupler 10 according to the first embodiment, the inductors L1 to L3 are disposed at the first major surface 501 of the substrate 50. In the example in FIG. 3, the inductors L1 to L3 are arranged from one end side (the left side in FIG. 3) of the substrate 50 in the first direction D1 in the order, the inductor L1, the inductor L2, and the inductor L3.

The substrate 50 is formed by stacking multiple insulating layers. The inductors L1 to L3 are layered-structure inductors with electrodes formed on the insulating layers. Specifically, the inductors L1 to L3 include individual patterns P1 disposed in different insulating layers in the direction perpendicular to the first direction D1 and the second direction D2 (the direction perpendicular to the drawing sheet of FIG. 3). In the example in FIG. 3, the inductors L1 to L3 include the three patterns P1. In this specification, a pattern shorter than half of a turn is referred to as a "wire", and a pattern longer than half of a turn is referred to as an "inductor" when viewed in plan view in the direction perpendicular to the first direction D1 and the second direction D2. Thus, the inductors L1 to L3 are "inductors" rather than "wires". It is preferable that the inductors L1 to L3 be identical to each other with respect to inductance, but the inductors L1 to L3 may be different from each other with respect to inductance.

The directional coupler 10 according to the first embodiment further includes, as illustrated in FIG. 3, electrodes 141 to 143. The electrode 141 is coupled to the output terminal 311 (see FIG. 1). The electrode 142 is coupled to the output terminal 312 (see FIG. 1). The electrode 143 is coupled to the output terminal 313 (see FIG. 1). The electrodes 141 to 143 are disposed at the second major surface 502 of the substrate 50. The electrodes 141 to 143 are arranged, as illustrated in FIG. 3, from one end side (the left side in FIG. 3) of the substrate 50 in the first direction D1 at regular intervals in the order, the electrode 141, the electrode 142, and the electrode 143. In other words, the electrodes 141 to 143 are disposed adjacent to each other at the second major surface 502 of the substrate 50. In this specification, the expression "two electrodes are disposed adjacent to each other" means that the two electrodes are disposed without any other element between the two electrodes.

In the directional coupler 10 according to the first embodiment, when viewed in plan view in the thickness direction of the substrate 50 (the direction perpendicular to the first direction D1 and the second direction D2), the inductor L1 and the electrode 141 overlap, the inductor L2 and the electrode 142 overlap, and the inductor L3 and the electrode 143 overlap. In the example in FIG. 3, when viewed in plan view in the thickness direction, the entire portion of the inductor L1 coincides with a portion of the electrode 141, the entire portion of the inductor L2 coincides with a portion of the electrode 142, and the entire portion of the inductor L3 coincides with a portion of the electrode 143.

When viewed in plan view in the thickness direction, the entire portion of the inductor L1 may coincide with the entire portion of the electrode 141, a portion of the inductor L1 may coincide with the entire portion of the electrode 141, or a portion of the inductor L1 may coincide with a portion of the electrode 141. When viewed in plan view in the thickness direction, the entire portion of the inductor L2 may coincide with the entire portion of the electrode 142, a portion of the inductor L2 may coincide with the entire portion of the electrode 142, or a portion of the inductor L2 may coincide with a portion of the electrode 142. When viewed in plan view in the thickness direction, the entire portion of the inductor L3 may coincide with the entire portion of the electrode 143, a portion of the inductor L3 may coincide with the entire portion of the electrode 143, or a portion of the inductor L3 may coincide with a portion of the electrode 143. Overall, the expression "when viewed in plan view in the thickness direction of a substrate, an inductor and an electrode overlap" means that at least a portion of the inductor coincides with at least a portion of the electrode.

3 Characteristics of Directional Coupler

Figure 4A:
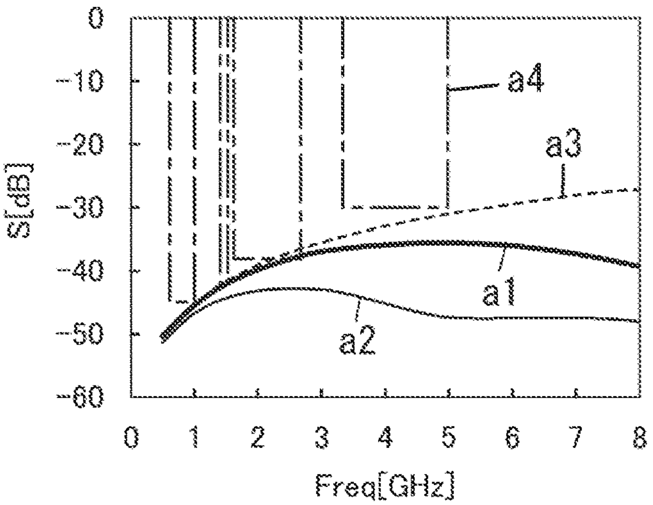
FIGS. 4A to 4C are graphs illustrating the plots of the frequency versus the S (Scattering) parameter of the detection signals outputted from the output terminals of the directional coupler.
Figure 4B:
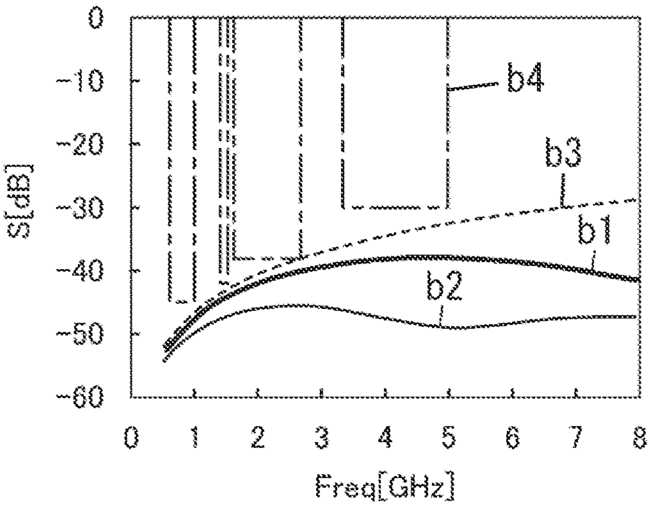
Figure 4C:
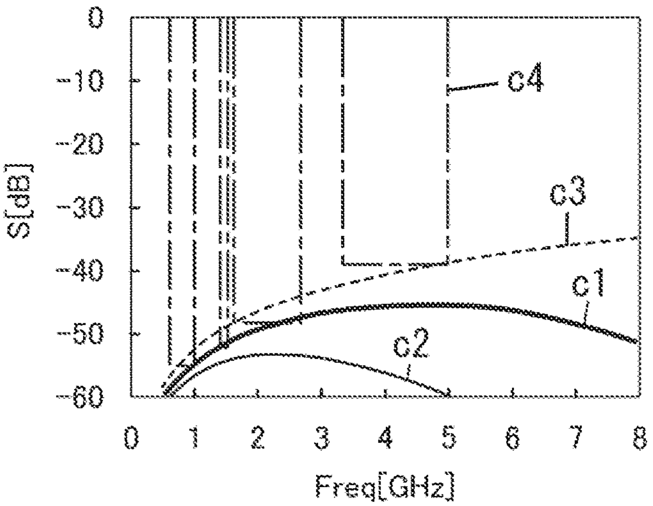

The following describes the characteristics of the directional coupler 10 with reference to FIGS. 4A to 4C. In FIGS. 4A to 4C, the horizontal axis indicates frequency, and the vertical axis indicates S (Scattering) parameter. FIG. 4A illustrates the characteristics of the detection signals outputted from the output terminal 311 (the electrode 141). FIG. 4B illustrates the characteristics of the detection signals outputted from the output terminal 312 (the electrode 142). FIG. 4C illustrates the characteristics of the detection signals outputted from the output terminal 313 (the electrode 143).

In FIG. 4A, a solid line a1 illustrates a waveform when the inductance of the inductor L1 coupled to the output terminal 311 is 2 nH, and a solid line a2 illustrates a waveform when the inductance of the inductor L1 coupled to the output terminal 311 is 4 nH. Also, in FIG. 4A, a dashed line a3 illustrates a waveform when the inductor L1 is not coupled to the output terminal 311 (a comparative example), and dot-dash lines a4 indicate the reference values of S parameter. It is desired that in the directional coupler 10 according to the first embodiment the S parameter of the detection signals outputted from the output terminal 311 be smaller than the reference values indicated by the dot-dash lines a4.

In the case in which the inductor L1 is not coupled to the output terminal 311 (the comparative example), the S parameter is above the reference value over a portion of the range of 2 to 3 GHz. By contrast, in the case in which the inductor L1 is coupled to the output terminal 311 (the first embodiment), when the inductance of the inductor L1 is 2 nH, the S parameter is equal to the reference value at a particular frequency within the range of 2 to 3 GHz, and the S parameter is smaller than the case in which the inductor L1 is not coupled to the output terminal 311. When the inductance of the inductor L1 is 4 nH, the S parameter is below the reference value over the range of 0.5 to 8 GHz. Overall, because the inductor L1 is coupled to the output terminal 311 in the directional coupler 10 according to the first embodiment, the S parameter in the directional coupler 10 is smaller than the case in which the inductor L1 is not coupled to the output terminal 311.

In FIG. 4B, a solid line b1 illustrates a waveform when the inductance of the inductor L2 coupled to the output terminal 312 is 2 nH, and a solid line b2 illustrates a waveform when the inductance of the inductor L2 coupled to the output terminal 312 is 4 nH. Also, in FIG. 4B, a dashed line b3 illustrates a waveform when the inductor L2 is not coupled to the output terminal 312 (a comparative example), and dot-dash lines b4 indicate the reference values of S parameter. It is desired that in the directional coupler 10 according to the first embodiment the S parameter of detection signals outputted from the output terminal 312 be smaller than the reference values indicated by the dot-dash lines b4.

In the case in which the inductor L2 is not coupled to the output terminal 312 (the comparative example), the S parameter is equal to the reference value at a particular frequency within the range of 2 to 3 GHz. By contrast, in the case in which the inductor L2 is coupled to the output terminal 312 (the first embodiment), when the inductance of the inductor L2 is either 2 nH or 4 nH, the S parameter is below the reference value over the range of 0.5 to 8 GHz. Overall, because the inductor L2 is coupled to the output terminal 312 in the directional coupler 10 according to the first embodiment, the S parameter in the directional coupler 10 is smaller than the case in which the inductor L2 is not coupled to the output terminal 312.

In FIG. 4C, a solid line c1 illustrates a waveform when the inductance of the inductor L3 coupled to the output terminal 313 is 2 nH, and a solid line c2 illustrates a waveform when the inductance of the inductor L3 coupled to the output terminal 313 is 4 nH. Also, in FIG. 4C, a dashed line c3 illustrates a waveform when the inductor L3 is not coupled to the output terminal 313 (a comparative example), and dot-dash lines c4 indicate the reference values of S parameter. It is desired that in the directional coupler 10 according to the first embodiment the S parameter of detection signals outputted from the output terminal 313 be smaller than the reference values indicated by the dot-dash lines c4.

In the case in which the inductor L3 is not coupled to the output terminal 313 (the comparative example), the S parameter is above the reference value over a portion of the range of 0.5 to 5 GHz. By contrast, in the case in which the inductor L3 is coupled to the output terminal 313 (the first embodiment), when the inductance of the inductor L3 is 2 nH, the S parameter is above the reference value over a portion of the range of 2 to 3 GHz, and the S parameter is smaller than the case in which the inductor L3 is not coupled to the output terminal 313. When the inductance of the inductor L3 is 4 nH, the S parameter is below the reference value over the range of 0.5 to 8 GHz. Overall, because the inductor L3 is coupled to the output terminal 313 in the directional coupler 10 according to the first embodiment, the S parameter in the directional coupler 10 is smaller than the case in which the inductor L3 is not coupled to the output terminal 313.

4 Effects 4.1 Directional Coupler

The directional coupler 10 according to the first embodiment includes the first output terminal (the output terminal 312 in the example in FIG. 1) for outputting the first detection signal and the second output terminal (the output terminal 313 in the example in FIG. 1) for outputting the second detection signal. The directional coupler 10 according to the first embodiment further includes the third output terminal (the output terminal 311 in the example in FIG. 1) for outputting the third detection signal (a detection signal from outside). With this configuration, the directional coupler 10 according to the first embodiment is able to simultaneously output the first detection signal, the second detection signal, and the third detection signal. In other words, the directional coupler 10 according to the first embodiment is able to simultaneously output multiple detection signals.

In the directional coupler 10 according to the first embodiment, when viewed in plan view in the thickness direction of the substrate 50, the inductor L1 and the electrode 141 overlap, and the inductor L2 and the electrode 142 overlap. In the directional coupler 10 according to the first embodiment, when viewed in plan view in the thickness direction of the substrate 50, the inductor L3 and the electrode 143 also overlap. In other words, in the directional coupler 10 according to the first embodiment, the inductor L1 corresponding to the electrode 141 is disposed near the electrode 141, and the inductor L2 corresponding to the electrode 142 is disposed near the electrode 142. In the directional coupler 10 according to the first embodiment, the inductor L3 corresponding to the electrode 143 is also disposed near the electrode 143. This configuration hinders the electromagnetic field coupling between adjacent inductors. As a result, it is possible to improve the detection characteristic of the directional coupler 10.

In the directional coupler 10 according to the first embodiment, the inductors are coupled to the respective output terminals. This configuration improves the isolation among the output terminals. As a result, it is possible to reduce the distances between the output terminals. Consequently, the size of the directional coupler 10 can be reduced.

4.2 Radio-Frequency Module and Communication Device

Because the radio-frequency module 100 according to the first embodiment and the communication device 300 according to the first embodiment include the directional coupler 10 described above, the radio-frequency module 100 and the communication device 300 are able to simultaneously output multiple detection signals.

Multiple electronic components constituting the signal processing circuit 200 may be mounted on, for example, the circuit board described above, or a circuit board (a second circuit board) different from the circuit board having the radio-frequency module 100 (a first circuit board). This means that the circuit board having the signal processing circuit 200 may be different from the circuit board having the radio-frequency module 100.

Second Embodiment

Figure 5:
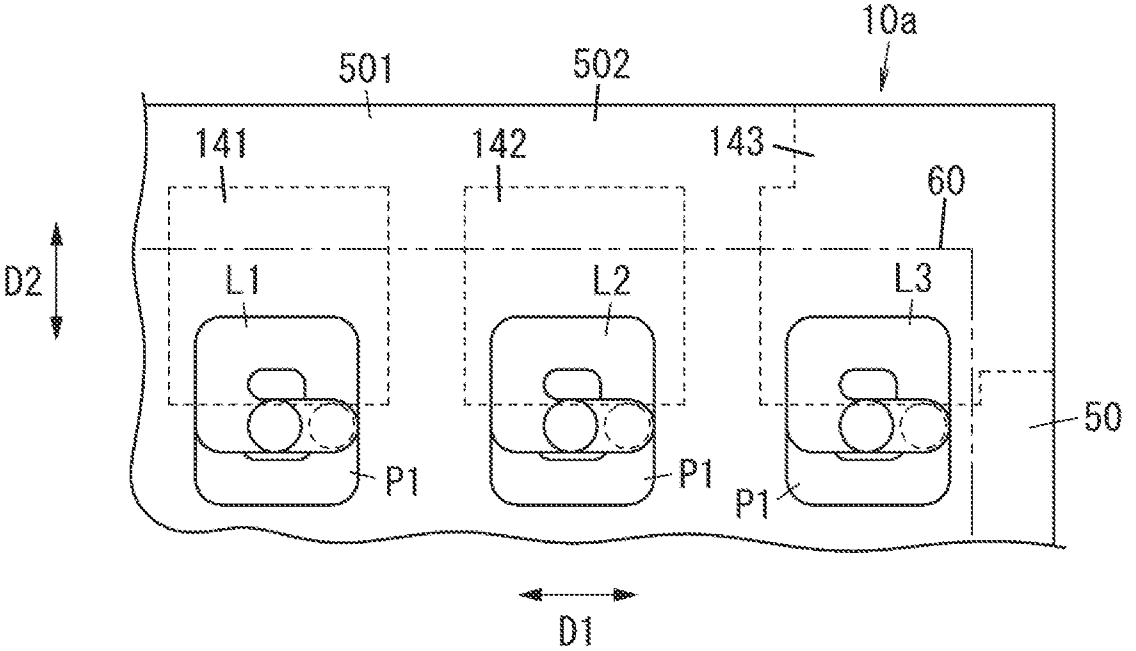
FIG. 5 is a partial enlargement of a directional coupler according to a second embodiment.

The following describes a configuration of a directional coupler 10*a* according to a second embodiment with reference to FIG. 5. Of the directional coupler 10*a* according to the second embodiment, the same constituent elements as the directional coupler 10 according to the first embodiment (see FIGS. 1 to 3) are assigned the same reference numerals, and descriptions thereof are not repeated.

The directional coupler 10*a* according to the second embodiment differs from the directional coupler 10 according to the first embodiment in that the inductors L1 to L3 are included in a semiconductor chip 60.

The directional coupler 10*a* according to the second embodiment further includes, as illustrated in FIG. 5, the semiconductor chip 60. The semiconductor chip 60 includes at least a portion of the first main line 11, the second main line 21, the first sub-lines 12 and 13, and the second sub-lines 22 and 23. In the second embodiment, the semiconductor chip 60 includes all of the first main line 11, the second main line 21, the first sub-lines 12 and 13, and the second sub-lines 22 and 23. The semiconductor chip 60 further includes the inductors L1 to L3. The semiconductor chip 60 is disposed at the first major surface 501 of the substrate 50. The inductors L1 to L3 are aligned in the first direction D1 in the semiconductor chip 60.

The electrode 141 coupled to the inductor L1, the electrode 142 coupled to the inductor L2, and the electrode 143 coupled to the inductor L3 are disposed at the second major surface 502 of the substrate 50 as with the first embodiment.

Also in the directional coupler 10*a* according to the second embodiment, when viewed in plan view in the thickness direction of the substrate 50 (the direction perpendicular to the first direction D1 and the second direction D2), the inductor L1 and the electrode 141 overlap, the inductor L2 and the electrode 142 overlap, and the inductor L3 and the electrode 143 overlap.

Because the directional coupler 10*a* according to the second embodiment also includes the first output terminal for outputting the first detection signal, the second output terminal for outputting the second detection signal, and the third output terminal for outputting the third detection signal, the directional coupler 10*a* is able to simultaneously output multiple detection signals.

Additionally, also in the directional coupler 10*a* according to the second embodiment, the inductors are coupled to the respective output terminals, and thus, the first output terminal, the second output terminal, and the third output terminal can be disposed close to each other. As a result, while hindering the degradation of the detection characteristic, it is possible to reduce the size of the directional coupler 10*a*.

Third Embodiment

Figure 6:
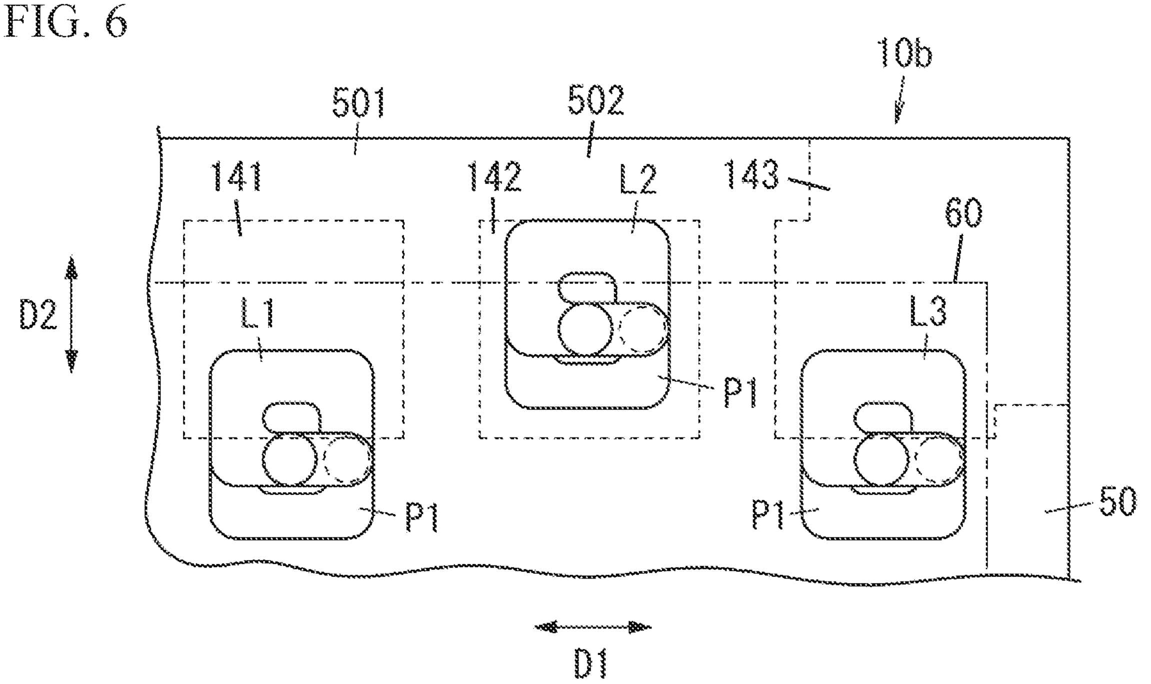
FIG. 6 is a partial enlargement of a directional coupler according to a third embodiment.

The following describes a configuration of a directional coupler 10*b* according to a third embodiment with reference to FIG. 6. Of the directional coupler 10*b* according to the third embodiment, the same constituent elements as the directional coupler 10*a* according to the second embodiment (see FIG. 5) are assigned the same reference numerals, and descriptions thereof are not repeated.

The directional coupler 10*b* according to the third embodiment differs from the directional coupler 10*a* according to the second embodiment in that the second inductor L2 is disposed at the substrate 50.

In the directional coupler 10*b* according to the third embodiment, as illustrated in FIG. 6, the inductors L1 and L3 are included in the semiconductor chip 60. The inductor L2 is disposed at the first major surface 501 of the substrate 50 as illustrated in FIG. 6. When viewed in plan view in the direction perpendicular to the first direction D1 and the second direction D2 (the direction perpendicular to the drawing sheet of FIG. 6), the inductors L1 to L3 are aligned in the first direction D1. The inductor L2 is located at a position different from the inductors L1 and L3 in the second direction D2 perpendicular to the first direction D1. In the example in FIG. 6, the inductor L2 is located closer to an edge (the upper side in FIG. 6) of the substrate 50 than the inductors L1 and L3 in the second direction D2.

Because the directional coupler 10*b* according to the third embodiment also includes the first output terminal for outputting the first detection signal, the second output terminal for outputting the second detection signal, and the third output terminal for outputting the third detection signal, the directional coupler 10*b* is able to simultaneously output multiple detection signals. In the directional coupler 10*b* according to the third embodiment, the inductors L1 and L3 are included in the semiconductor chip 60, and the inductor L2 is disposed at the substrate 50. This configuration hinders the electromagnetic field coupling between the inductors L1 and L3 and the inductor L2. As a result, it is possible to improve the detection characteristic of the directional coupler 10*b*. In the directional coupler 10*b* according to the third embodiment, the inductors L1 and L3 included in the semiconductor chip 60 are spaced apart from each other in the second direction D2. This configuration reduces the electromagnetic field coupling between the inductors L1 and L3 as well. As a result, it is possible to further improve the detection characteristic of the directional coupler 10*b*.

In the third embodiment, the inductors L1 and L3 are included in the semiconductor chip 60, and the inductor L2 is disposed at the substrate 50; however, for example, the inductors L1 and L3 may be disposed at the substrate 50, and the inductor L2 may be included in the semiconductor chip 60. Overall, it is sufficient that the inductors L1 and L3 or the inductor L2 be included in the semiconductor chip 60, and the remainder of the inductors L1 and L3 and the inductor L2 be disposed at the substrate 50.

Fourth Embodiment

Figure 7:
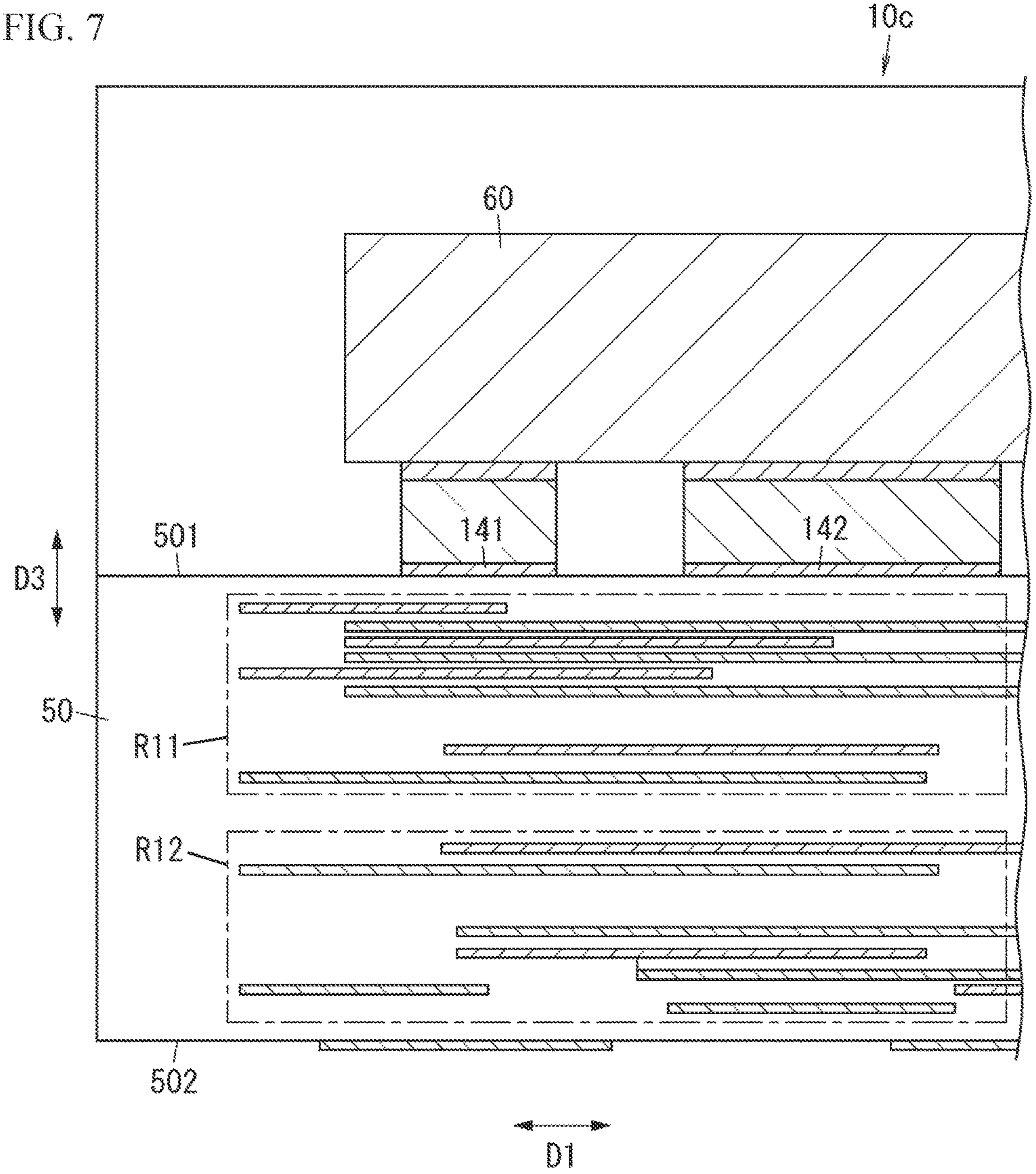
FIG. 7 is a sectional view of a directional coupler according to a fourth embodiment.

The following describes a configuration of a directional coupler 10*c* according to a fourth embodiment with reference to FIG. 7. Of the directional coupler 10*c* according to the fourth embodiment, the same constituent elements as the directional coupler 10 according to the first embodiment (see FIGS. 1 to 3) are assigned the same reference numerals, and descriptions thereof are not repeated.

The directional coupler 10*c* according to the fourth embodiment differs from the directional coupler 10 according to the first embodiment in that the inductors L1 and L2 are disposed in the substrate 50.

In the directional coupler 10*c* according to the fourth embodiment, as illustrated in FIG. 7, the inductors L1 and L2 are disposed in the substrate 50. In other words, the substrate 50 is a multilayer substrate including the inductors L1 and L2. The substrate 50 has a first region R11 and a second region R12. The first region R11 is a region including wiring layers constituting the inductor L1. The second region R12 is a region including wiring layers constituting the inductor L2. In the example in FIG. 7, the first region R11 and the second region R12 are positioned apart from each other in a third direction D3 that is the thickness direction of the substrate 50. This means that in the directional coupler 10*c* according to the fourth embodiment the inductor L1 is entirely disposed in layers different from the inductor L2.

In the example in FIG. 7, when viewed in plan view in the third direction D3, the inductor L1 and the electrode 141 overlap, and the inductor L2 and the electrode 142 overlap.

Because the directional coupler 10*c* according to the fourth embodiment also includes the first output terminal for outputting the first detection signal, the second output terminal for outputting the second detection signal, and the third output terminal for outputting the third detection signal, the directional coupler 10*c* is able to simultaneously output multiple detection signals. In the directional coupler 10*c* according to the fourth embodiment, the inductors L1 and L2 are disposed in different layers of the substrate 50. This configuration hinders the electromagnetic field coupling between the inductors L1 and L2. Consequently, the detection characteristic of the directional coupler 10*c* is improved.

The inductor L3 may be included in the semiconductor chip 60, disposed at the first major surface 501 of the substrate 50, or disposed in the substrate 50. In the fourth embodiment, the inductor L1 is entirely disposed in layers different from the inductor L2, but a portion of the inductor L1 may be disposed in the same layer as the inductor L2. This means that it is sufficient at least a portion of the inductor L1 be provided in a layer different from the inductor L2.

Fifth Embodiment

Figure 8:
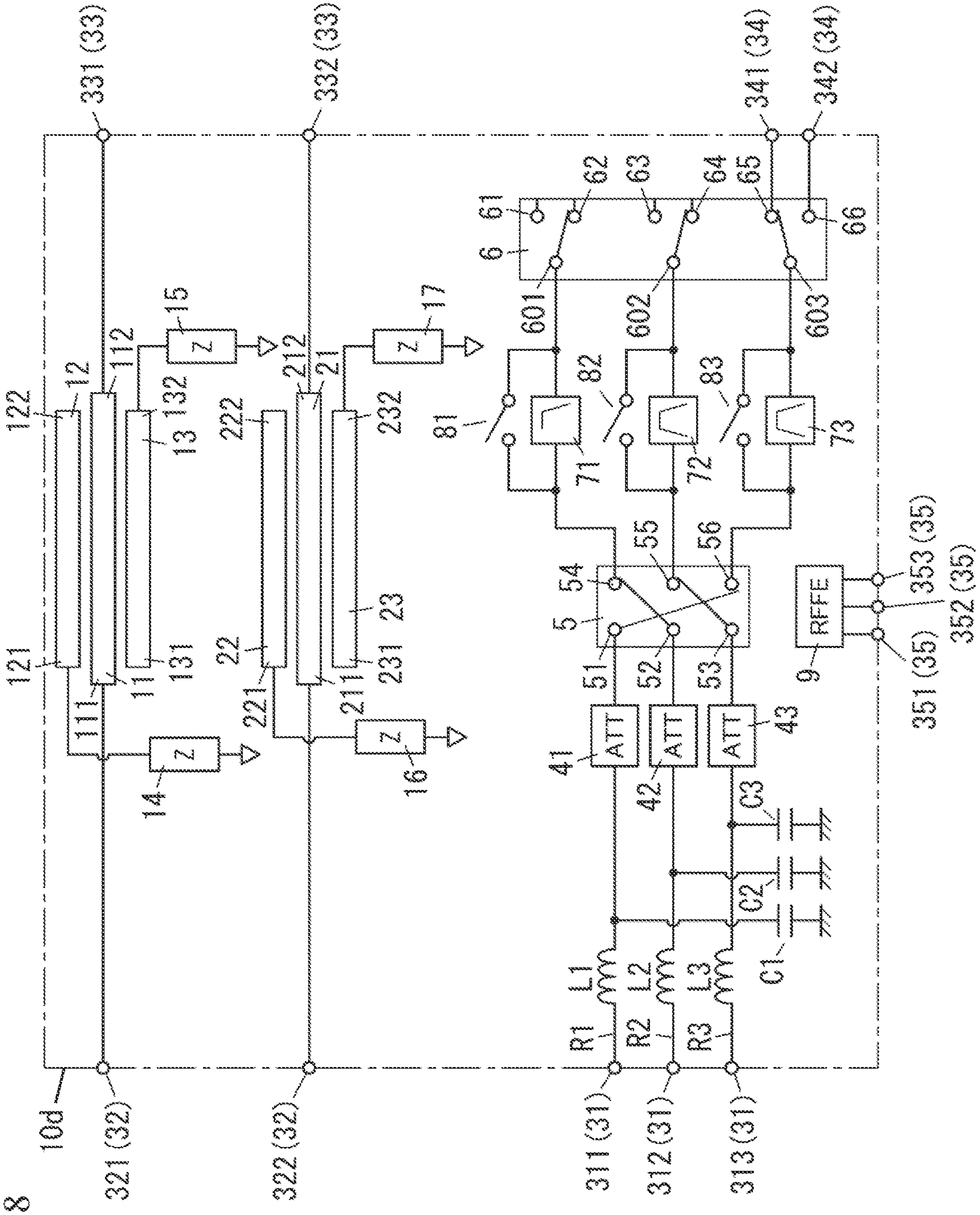
FIG. 8 is a circuit diagram of a directional coupler according to a fifth embodiment.

The following describes a configuration of a directional coupler 10*d* according to a fifth embodiment with reference to FIG. 8. Of the directional coupler 10*d* according to the fifth embodiment, the same constituent elements as the directional coupler 10 according to the first embodiment (see FIGS. 1 to 3) are assigned the same reference numerals, and descriptions thereof are not repeated.

The directional coupler 10*d* according to the fifth embodiment differs from the directional coupler 10 according to the first embodiment in that the directional coupler 10*d* further includes a capacitor C1 coupled between the signal path R1 and the ground. The directional coupler 10*d* according to the fifth embodiment differs from the directional coupler 10 according to the first embodiment in that the directional coupler 10*d* further includes a capacitor C2 coupled between the signal path R2 and the ground. The directional coupler 10*d* according to the fifth embodiment differs from the directional coupler 10 according to the first embodiment in that the directional coupler 10*d* further includes a capacitor C3 coupled between the signal path R3 and the ground.

1 Configuration

The directional coupler 10*d* according to the fifth embodiment includes, as illustrated in FIG. 8, the first main line 11, the first sub-lines 12 and 13, the second main line 21, the second sub-lines 22 and 23, and termination circuits 14 to 17. The directional coupler 10*d* further includes the first connection terminals 31, the second connection terminals 32, the third connection terminals 33, the fourth connection terminals 34, and the fifth connection terminals 35. The directional coupler 10*d* further includes the inductors L1 to L3, the attenuators 41 to 43, and the switches 5 and 6. The directional coupler 10*d* further includes the filters 71 to 73, the short circuiting switches 81 to 83, and the RFFE 9. The directional coupler 10*d* further includes the capacitors C1 to C3.

The capacitor C1 is coupled between the signal path R1 and the ground. More specifically, the capacitor C1 is coupled between the ground and a node of the inductor L1 and the attenuator 41.

The capacitor C2 is coupled between the signal path R2 and the ground. More specifically, the capacitor C2 is coupled between the ground and a node of the inductor L2 and the attenuator 42.

The capacitor C3 is coupled between the signal path R3 and the ground. More specifically, the capacitor C3 is coupled between the ground and a node of the inductor L3 and the attenuator 43.

In the example in FIG. 8, in the switch 5, the first terminal 51 is coupled to the sixth terminal 56, the second terminal 52 is coupled to the fourth terminal 54, and the third terminal 53 is coupled to the fifth terminal 55. In this case, the capacitor C2 is a first capacitor, the capacitor C3 is a second capacitor, and the capacitor C1 is a third capacitor.

For example, when in the switch 5, the first terminal 51 is coupled to the fourth terminal 54, the second terminal 52 is coupled to the fifth terminal 55, and the third terminal 53 is coupled to the sixth terminal 56, the capacitor C1 is the first capacitor, the capacitor C2 is the second capacitor, and the capacitor C3 is the third capacitor.

2 Effects

Because the directional coupler 10*d* according to the fifth embodiment also includes the first output terminal for outputting the first detection signal, the second output terminal for outputting the second detection signal, and the third output terminal for outputting the third detection signal, the directional coupler 10*d* is able to simultaneously output multiple detection signals.

Furthermore, because the directional coupler 10*d* according to the fifth embodiment further includes the capacitors C1 to C3, the impedance matching among the signal paths R1 to R3 is easily achieved. As a result, it is possible to improve the detection characteristic of the directional coupler 10*d*.

3 Modifications

In the fifth embodiment, the capacitor C1 is coupled between the ground and a node of the inductor L1 and the attenuator 41, but the capacitor C1 may be, for example, coupled between the ground and a node of the output terminal 311 and the inductor L1. Similarly, the capacitor C2 may be, for example, coupled between the ground and a node of the output terminal 312 and the inductor L2. Similarly, the capacitor C3 may be, for example, coupled between the ground and a node of the output terminal 313 and the inductor L3.

The directional coupler 10*d* according to the fifth embodiment includes the three capacitors C1 to C3, but the directional coupler 10*d* may include, for example, only the capacitor C1, only the capacitor C2, or only the capacitor C3. Alternatively, the directional coupler 10*d* may include the two capacitors C1 and C2, the two capacitors C2 and C3, or the two capacitors C3 and C1.

Sixth Embodiment

Figure 9:
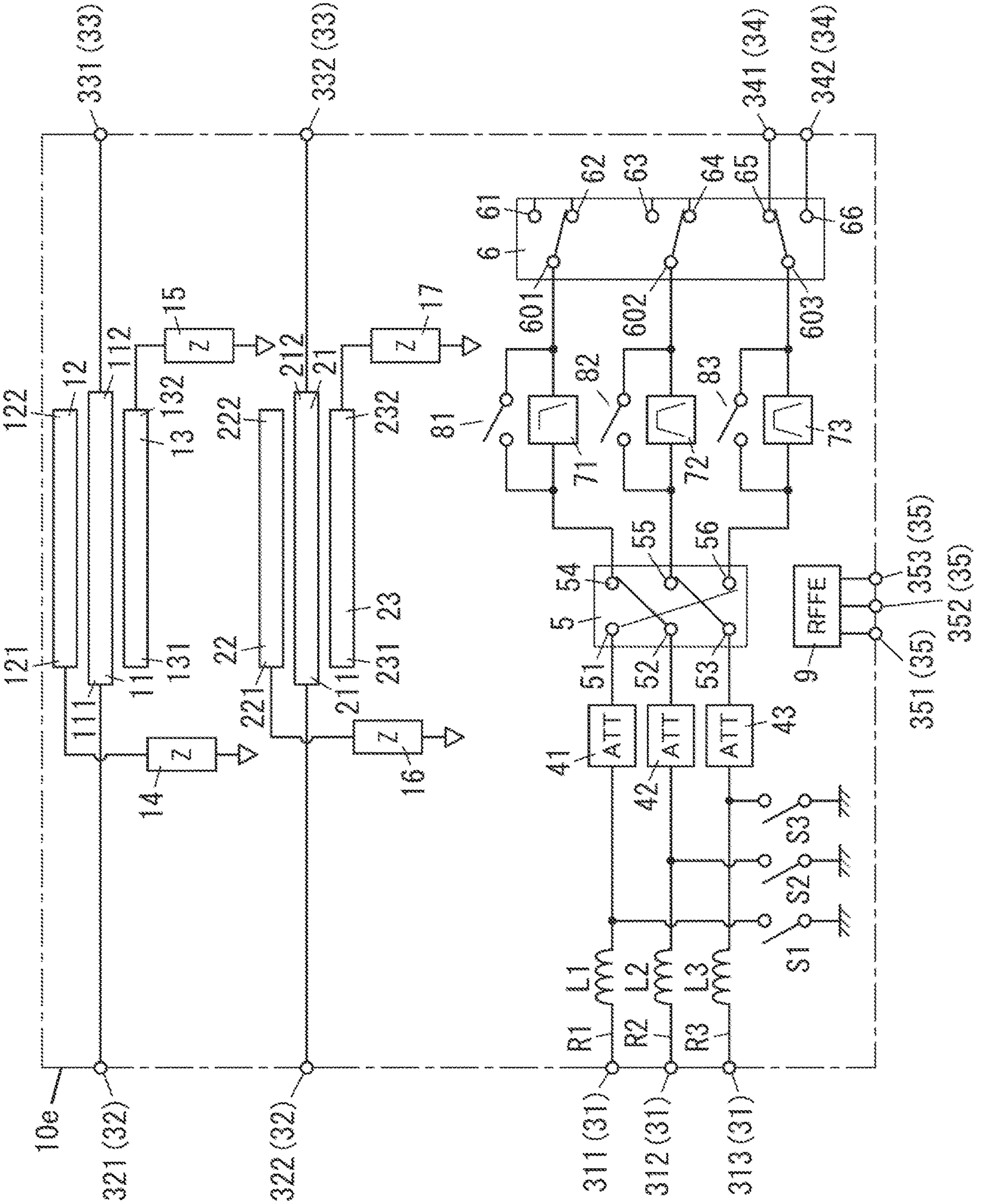
FIG. 9 is a circuit diagram of a directional coupler according to a sixth embodiment.

The following describes a configuration of a directional coupler 10*e* according to a sixth embodiment with reference to FIG. 9. Of the directional coupler 10*e* according to the sixth embodiment, the same constituent elements as the directional coupler 10 according to the first embodiment (see FIGS. 1 to 3) are assigned the same reference numerals, and descriptions thereof are not repeated.

The directional coupler 10*e* according to the sixth embodiment differs from the directional coupler 10 according to the first embodiment in that the directional coupler 10*e* further includes a switch S1 coupled between the signal path R1 and the ground. The directional coupler 10*e* according to the sixth embodiment differs from the directional coupler 10 according to the first embodiment in that the directional coupler 10*e* further includes a switch S2 coupled between the signal path R2 and the ground. The directional coupler 10*e* according to the sixth embodiment differs from the directional coupler 10 according to the first embodiment in that the directional coupler 10*e* further includes a switch S3 coupled between the signal path R3 and the ground.

1 Configuration

The directional coupler 10*e* according to the sixth embodiment includes, as illustrated in FIG. 9, the first main line 11, the first sub-lines 12 and 13, the second main line 21, the second sub-lines 22 and 23, and termination circuits 14 to 17. The directional coupler 10*e* further includes the first connection terminals 31, the second connection terminals 32, the third connection terminals 33, the fourth connection terminals 34, and the fifth connection terminals 35. The directional coupler 10*e* further includes the inductors L1 to L3, the attenuators 41 to 43, and the switches 5 and 6. The directional coupler 10*e* further includes the filters 71 to 73, the short circuiting switches 81 to 83, and the RFFE 9. The directional coupler 10*e* further includes the switches S1 to S3.

The switch S1 is coupled between the signal path R1 and the ground. More specifically, the switch S1 is coupled between the ground and a node of the inductor L1 and the attenuator 41. In the directional coupler 10*e* according to the sixth embodiment, while the switch S1 is kept off, the off-capacitance of the switch S1 increases.

The switch S2 is coupled between the signal path R2 and the ground. More specifically, the switch S2 is coupled between the ground and a node of the inductor L2 and the attenuator 42. In the directional coupler 10*e* according to the sixth embodiment, while the switch S2 is kept off, the off-capacitance of the switch S2 increases.

The switch S3 is coupled between the signal path R3 and the ground. More specifically, the switch S3 is coupled between the ground and a node of the inductor L3 and the attenuator 43. In the directional coupler 10*e* according to the sixth embodiment, while the switch S3 is kept off, the off-capacitance of the switch S3 increases.

In the example in FIG. 9, in the switch 5, the first terminal 51 is coupled to the sixth terminal 56, the second terminal 52 is coupled to the fourth terminal 54, and the third terminal 53 is coupled to the fifth terminal 55. In this case, the switch S2 is a first switch, the switch S3 is a second switch, and the switch S1 is a third switch.

For example, when in the switch 5, the first terminal 51 is coupled to the fourth terminal 54, the second terminal 52 is coupled to the fifth terminal 55, and the third terminal 53 is coupled to the sixth terminal 56, the switch S1 is the first switch, the switch S2 is the second switch, and the switch S3 is the third switch.

2 Effects

Because the directional coupler 10*e* according to the sixth embodiment also includes the first output terminal for outputting the first detection signal, the second output terminal for outputting the second detection signal, and the third output terminal for outputting the third detection signal, the directional coupler 10*e* is able to simultaneously output multiple detection signals.

Furthermore, because the directional coupler 10*e* according to the sixth embodiment further includes the switches S1 to S3, the impedance matching among the signal paths R1 to R3 is easily achieved. As a result, it is possible to improve the detection characteristic of the directional coupler 10*e*.

3 Modifications

In the sixth embodiment, the switch S1 is coupled between the ground and a node of the inductor L1 and the attenuator 41, but the switch S1 may be, for example, coupled between the ground and a node of the output terminal 311 and the inductor L1. Similarly, the switch S2 may be, for example, coupled between the ground and a node of the output terminal 312 and the inductor L2. Similarly, the switch S3 may be, for example, coupled between the ground and a node of the output terminal 313 and the inductor L3.

The directional coupler 10*e* according to the sixth embodiment includes the three switches S1 to S3, but the directional coupler 10*e* may include, for example, only the switch S1, only the switch S2, or only the switch S3. Alternatively, the directional coupler 10*e* may include the two switches S1 and S2, the two switches S2 and S3, or the two switches S3 and S1.

Seventh Embodiment

Figure 10:
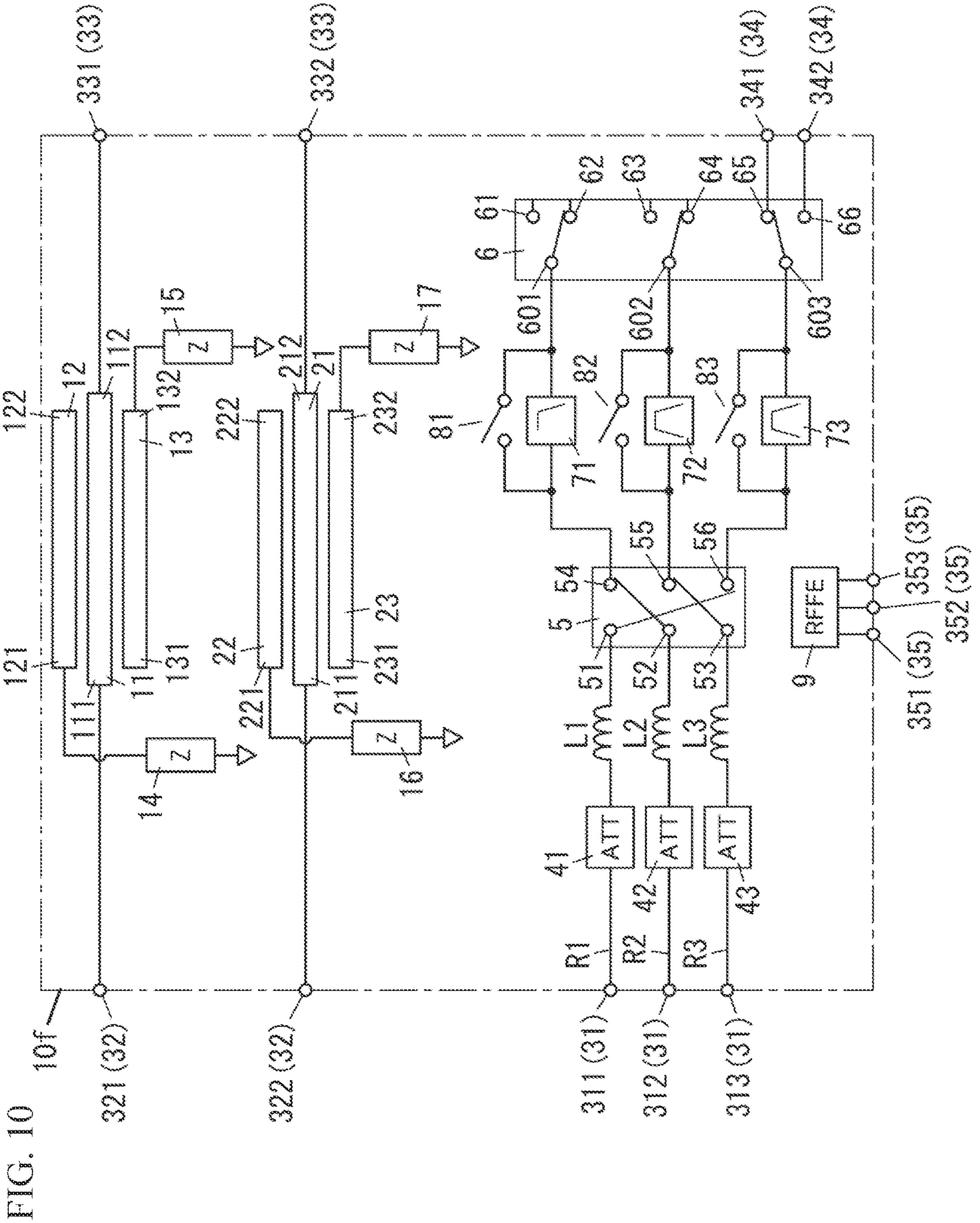
FIG. 10 is a circuit diagram of a directional coupler according to a seventh embodiment.

The following describes a configuration of a directional coupler 10*f* according to a seventh embodiment with reference to FIG. 10. Of the directional coupler 10*f* according to the seventh embodiment, the same constituent elements as the directional coupler 10 according to the first embodiment (see FIGS. 1 to 3) are assigned the same reference numerals, and descriptions thereof are not repeated.

The directional coupler 10*f* according to the seventh embodiment differs from the directional coupler 10 according to the first embodiment in that the inductor L1 is provided between the attenuator 41 and the first terminal 51 of the switch 5. The directional coupler 10*f* according to the seventh embodiment differs from the directional coupler 10 according to the first embodiment also in that the inductor L2 is provided between the attenuator 42 and the second terminal 52 of the switch 5. The directional coupler 10*f* according to the seventh embodiment differs from the directional coupler 10 according to the first embodiment also in that the inductor L3 is provided between the attenuator 43 and the third terminal 53 of the switch 5.

1 Configuration

The directional coupler 10*f* according to the seventh embodiment includes, as illustrated in FIG. 10, the first main line 11, the first sub-lines 12 and 13, the second main line 21, the second sub-lines 22 and 23, and termination circuits 14 to 17. The directional coupler 10*f* further includes the first connection terminals 31, the second connection terminals 32, the third connection terminals 33, the fourth connection terminals 34, and the fifth connection terminals 35. The directional coupler 10*f* further includes the inductors L1 to L3, the attenuators 41 to 43, and the switches 5 and 6. The directional coupler 10*f* further includes the filters 71 to 73, the short circuiting switches 81 to 83, and the RFFE 9.

The inductor L1 is provided in the signal path between the attenuator 41 and the first terminal 51 of the switch 5 of the signal path R1. More specifically, the first end of the inductor L1 is coupled to the attenuator 41, and the second end of the inductor L1 is coupled to the first terminal 51 of the switch 5.

The inductor L2 is provided in the signal path between the attenuator 42 and the second terminal 52 of the switch 5 of the signal path R2. More specifically, the first end of the inductor L2 is coupled to the attenuator 42, and the second end of the inductor L2 is coupled to the second terminal 52 of the switch 5.

The inductor L3 is provided in the signal path between the attenuator 43 and the third terminal 53 of the switch 5 of the signal path R3. More specifically, the first end of the inductor L3 is coupled to the attenuator 43, and the second end of the inductor L3 is coupled to the third terminal 53 of the switch 5.

In the example in FIG. 10, in the switch 5, the first terminal 51 is coupled to the sixth terminal 56, the second terminal 52 is coupled to the fourth terminal 54, and the third terminal 53 is coupled to the fifth terminal 55. In this case, the inductor L2 is the first inductor, the inductor L3 is the second inductor, and the inductor L1 is the third inductor.

For example, when in the switch 5, the first terminal 51 is coupled to the fourth terminal 54, the second terminal 52 is coupled to the fifth terminal 55, and the third terminal 53 is coupled to the sixth terminal 56, the inductor L1 is the first inductor, the inductor L2 is the second inductor, and the inductor L3 is the third inductor.

2 Effects

Because the directional coupler 10*f* according to the seventh embodiment also includes the first output terminal for outputting the first detection signal, the second output terminal for outputting the second detection signal, and the third output terminal for outputting the third detection signal, the directional coupler 10*f* is able to simultaneously output multiple detection signals.

Eighth Embodiment

Figure 11:
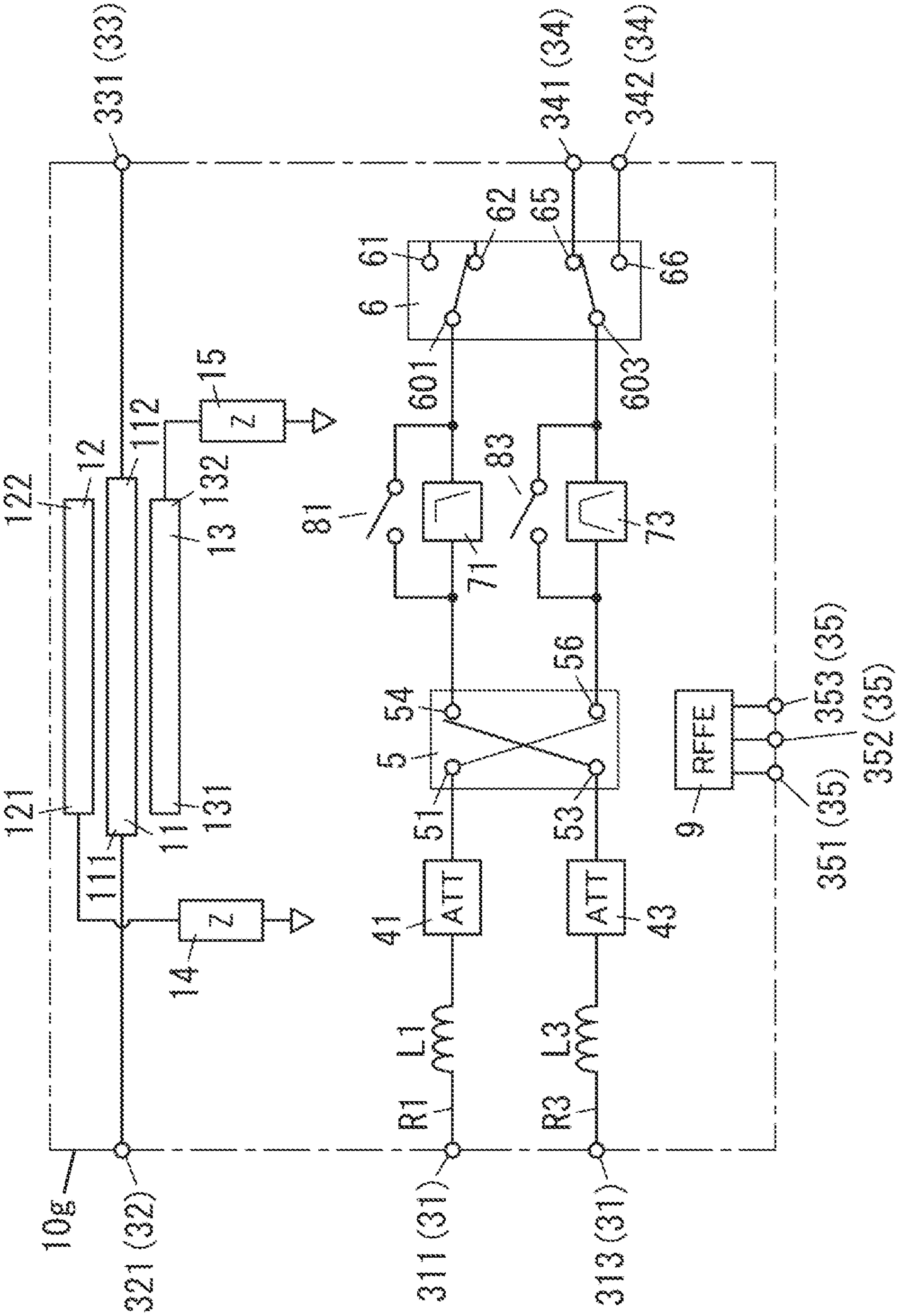
FIG. 11 is a circuit diagram of a directional coupler according to an eighth embodiment.

The following describes a configuration of a directional coupler 10*g* according to an eighth embodiment with reference to FIG. 11. Of the directional coupler 10*g* according to the eighth embodiment, the same constituent elements as the directional coupler 10 according to the first embodiment (see FIGS. 1 to 3) are assigned the same reference numerals, and descriptions thereof are not repeated.

The directional coupler 10*g* according to the eighth embodiment differs from the directional coupler according to the first embodiment in that the directional coupler 10*g* does not include the second main line 21, the second sub-lines 22 and 23, the termination circuits 16 and 17, and the input-output terminals 322 and 332. The directional coupler 10*g* according to the eighth embodiment differs from the directional coupler 10 according to the first embodiment in that the directional coupler 10*g* does not include the output terminal 312, the inductor L2, the attenuator 42, the filter 72, and the short circuiting switch 82. The directional coupler 10*g* according to the eighth embodiment differs from the directional coupler 10 according to the first embodiment in that the directional coupler 10*g* does not include the second terminal 52 and the fifth terminal 55 in the switch 5. The directional coupler 10*g* according to the eighth embodiment differs from the directional coupler 10 according to the first embodiment in that the directional coupler 10*g* does not include the common terminal 602 and the selection terminals 63 and 64 in the switch 6.

1 Configuration

The directional coupler 10*g* according to the eighth embodiment includes, as illustrated in FIG. 11, a main line 11, sub-lines 12 and 13, and the termination circuits 14 and 15. The directional coupler 10*g* further includes multiple first connection terminals 31, one second connection terminal 32, one third connection terminal 33, multiple fourth connection terminals 34, and multiple fifth connection terminals 35. The directional coupler 10*g* further includes the inductors L1 and L3, the attenuators 41 and 43, and the switches 5 and 6. The directional coupler 10*g* further includes the filters 71 and 73, the short circuiting switches 81 and 83, and the RFFE 9.

The switch 5 has, as illustrated in FIG. 11, the first terminal 51, the third terminal 53, the fourth terminal 54, and the sixth terminal 56. In the switch 5, the first terminal 51 is coupleable to the fourth terminal 54 or the sixth terminal 56. In the switch 5, the third terminal 53 is coupleable to the fourth terminal 54 or the sixth terminal 56.

The switch 6 has the common terminals 601 and 603 and the selection terminals 61, 62, 65, and 66. In the switch 6, the common terminal 601 is coupleable to the selection terminal 61 or the selection terminal 62. In the switch 6, the common terminal 603 is coupleable to the selection terminal 65 or the selection terminal 66. In the eighth embodiment, the common terminal 601 is the first common terminal, and the selection terminals 61 and 62 are the first selection terminal. In the eighth embodiment, the common terminal 603 is the second common terminal, and the selection terminals 65 and 66 are the second selection terminal. In the directional coupler 10*g* according to the eighth embodiment, the switch 6 has a mode in which the first common terminal is coupled to the first selection terminal, and the second common terminal is coupled to the second selection terminal.

In the example in FIG. 11, in the switch 5, the first terminal 51 is coupled to the sixth terminal 56, and the third terminal 53 is coupled to the fourth terminal 54. In this case, the output terminal 313 is the first output terminal, the inductor L3 is the first inductor, and the signal path R3 is the first signal path. In this case, the output terminal 311 is the second output terminal, the inductor L1 is the second inductor, and the signal path R1 is the second signal path.

For example, when the first terminal 51 is coupled to the fourth terminal 54, and the third terminal 53 is coupled to the sixth terminal 56 in the switch 5, the output terminal 311 is the first output terminal, the inductor L1 is the first inductor, and the signal path R1 is the first signal path. In this case, the output terminal 313 is the second output terminal, the inductor L3 is the second inductor, and the signal path R3 is the second signal path.

2 Effects

Because the directional coupler 10*g* according to the eighth embodiment includes the first output terminal (the output terminal 313 in the example in FIG. 11) for outputting the first detection signal and the second output terminal (the output terminal 311 in the example in FIG. 11) for outputting the second detection signal (a detection signal from outside), the directional coupler 10*g* is able to simultaneously output multiple detection signals.

Other Modifications

The first to eighth embodiments and their modifications are merely examples of various embodiments of the present disclosure. Various modifications to the first to eighth embodiments and their modifications may be made for, for example, different designs when the possible benefits of the present disclosure can be achieved; different constituent elements of different embodiments may be combined in any appropriate manner.

The radio-frequency module 100 according to the first embodiment may include any of the directional couplers 10*a* to 10*g* instead of the directional coupler 10.

The directional coupler 10 according to the first embodiment includes the two first sub-lines 12 and 13, but the directional coupler 10 may include one first sub-line, or three or more first sub-lines. The directional coupler 10 according to the first embodiment includes the two second sub-lines 22 and 23, but the directional coupler 10 may include one second sub-line, or three or more second sub-lines. The same holds for the second to seventh embodiments.

The directional coupler 10*g* according to the eighth embodiment includes the two sub-lines 12 and 13, but the directional coupler 10*g* may include one sub-line, or three or more sub-lines.

In the directional coupler 10 according to the first embodiment, all the inductors L1 to L3 overlap the corresponding electrodes when viewed in plan view in the thickness direction of the substrate 50. However, it may also be possible that at least one of the inductors L1 to L3 does not overlap the corresponding electrode when viewed in plan view in the thickness direction. The same holds for the second to eighth embodiments.

In this specification, the expression "an element is disposed at a first major surface of a substrate" includes not only the case in which the element is mounted directly on the first major surface of the substrate, but also the case in which, between a first major surface-side space and a second major surface-side space that are separated by the substrate, the element is positioned in the first major surface-side space. This means that the expression "an element is disposed at a first major surface of a substrate" includes the case in which the element is mounted on the first major surface of the substrate with another circuit element or a component such as an electrode interposed therebetween. The element may be, for example, but not limited to, the semiconductor chip 60. The substrate may be, for example, the substrate 50. When the substrate is the substrate 50, the first major surface is the first major surface 501, and the second major surface is the second major surface 502.

In this specification, the expression "an element is disposed at a second major surface of a substrate" includes not only the case in which the element is mounted directly on the second major surface of the substrate, but also the case in which, between a first major surface-side space and a second major surface-side space that are separated by the substrate, the element is positioned in the second major surface-side space. This means that the expression "an element is disposed at a second major surface of a substrate" includes the case in which the element is mounted on the second major surface of the substrate with another circuit element or a component such as an electrode interposed therebetween. The element may be, for example, but not limited to, the electrodes 141 to 143. The substrate may be, for example, the substrate 50. When the substrate is the substrate 50, the first major surface is the first major surface 501, and the second major surface is the second major surface 502.

Aspects

This specification discloses the following aspects.

A directional coupler (10; 10*a*-10*f*) according to a first aspect includes a first main line (11), a second main line (21), a first sub-line (12, 13), a second sub-line (22, 23), a first output terminal (312), a second output terminal (313), a first inductor (L2), and a second inductor (L3). The second main line (21) is a main line different from the first main line (11). The first sub-line (12, 13) is configured to be electromagnetically coupled to the first main line (11). The second sub-line (22, 23) is configured to be electromagnetically coupled to the second main line (21). The first output terminal (312) is configured to be coupled to the first sub-line (12, 13). The first output terminal (312) is configured to output a first detection signal corresponding to a first radio-frequency signal transferred through the first main line (11). The second output terminal (313) is configured to be coupled to the second sub-line (22, 23). The second output terminal (313) is configured to output a second detection signal corresponding to a second radio-frequency signal transferred through the second main line (21). The first inductor (L2) is provided in a first signal path (R2) including the first output terminal (312). The second inductor (L3) is provided in a second signal path (R3) including the second output terminal (313).

According to this aspect, the directional coupler (10; 10*a*-10*f*) includes the first output terminal (312) for outputting the first detection signal and the second output terminal (313) for outputting the second detection signal. This configuration enables the simultaneous output of the first detection signal and the second detection signal. Therefore, according to this aspect, it is possible to simultaneously output multiple detection signals.

A directional coupler (10*g*) according to a second aspect includes a main line (11), a sub-line (12, 13), a first output terminal (313), the second output terminal (311), a first inductor (L3), and a second inductor (L1). The sub-line (12, 13) is configured to be electromagnetically coupled to the main line (11). The first output terminal (313) is configured to be coupled to the sub-line (12, 13). The first output terminal (313) is configured to output a first detection signal corresponding to a radio-frequency signal transferred through the main line (11). A second output terminal (311) is configured to output a second detection signal from outside. The first inductor (L3) is provided in a first signal path (R3) including the first output terminal (313). The second inductor (L1) is provided in a second signal path (R1) including the second output terminal (311).

According to this aspect, the directional coupler (10*g*) includes the first output terminal (313) for outputting the first detection signal and the second output terminal (311) for outputting the second detection signal. This configuration enables the simultaneous output of the first detection signal and the second detection signal. Therefore, according to this aspect, it is possible to simultaneously output multiple detection signals.

The directional coupler (10*d*; 10*e*) according to a third aspect, with respect to the first or second aspect, further includes at least one of a first capacitor (C2) or first switch (S2) and a second capacitor (C3) or second switch (S3). The first capacitor (C2) or the first switch (S2) is coupled between the first signal path (R2) and the ground. The second capacitor (C3) or the second switch (S3) is coupled between the second signal path (R3) and the ground.

According to this aspect, the impedance matching among the signal paths is achieved more easily than the case in which only inductors are included. As a result, it is possible to improve the detection characteristic of the directional coupler (10*d*; 10*e*).

The directional coupler (10; 10*a*-10*f*) according to a fourth aspect, with respect to the first or third aspect, further includes a substrate (50), a first electrode (142), and a second electrode (143). The substrate (50) has a semiconductor chip (60) including at least a portion of the first main line (11), the second main line (21), the first sub-line (12, 13), and the second sub-line (22, 23). The first electrode (142) is disposed at the substrate (50). The first electrode (142) is coupled to the first output terminal (312). The second electrode (143) is disposed adjacent to the first electrode (142) at the substrate (50). The second electrode (143) is coupled to the second output terminal (313).

According to this aspect, the first electrode (142) and the second electrode (143) are disposed adjacent to each other. As a result, while hindering the degradation of the detection characteristic, it is possible to reduce the size of the directional coupler (10; 10*a*-10*f*).

The directional coupler (10*g*) according to a fifth aspect, with respect to the second or third aspect, further includes a substrate (50), a first electrode (143), and a second electrode (141). The substrate (50) has a semiconductor chip (60) including at least a portion of the main line (11) and the sub-line (12, 13). The first electrode (143) is disposed at the substrate (50). The first electrode (143) is coupled to the first output terminal (313). The second electrode (141) is disposed adjacent to the first electrode (143) at the substrate (50). The second electrode (141) is coupled to the second output terminal (311).

According to this aspect, the first electrode (143) and the second electrode (141) are disposed adjacent to each other. As a result, while hindering the degradation of the detection characteristic, it is possible to reduce the size of the directional coupler (10*g*).

In the directional coupler (10; 10*a*-10*g*) according to a sixth aspect, with respect to the fourth or fifth aspect, the first electrode (142; 143) and the second electrode (143; 141) are disposed at the substrate (50). The first inductor (L2; L3) and the first electrode (142; 143) overlap in a thickness direction of the substrate (50); the second inductor (L3; L1) and the second electrode (143; 141) overlap in the thickness direction of the substrate (50); or the first inductor (L2; L3) and the first electrode (142; 143) overlap in the thickness direction of the substrate (50), and the second inductor (L3; L1) and the second electrode (143; 141) overlap in the thickness direction of the substrate (50).

According to this aspect, the first inductor (L2; L3) is disposed near the corresponding first electrode (142; 143), and the second inductor (L3; L1) is disposed near the corresponding second electrode (143; 141). This configuration hinders the electromagnetic field coupling between the first inductor (L2; L3) and the second inductor (L3; L1). As a result, it is possible to improve the detection characteristic of the directional coupler (10; 10*a*-10*g*).

In the directional coupler (10*c*) according to a seventh aspect, with respect to the fourth or fifth aspect, the substrate (50) is a multilayer substrate including the first inductor (L1) and the second inductor (L2). At least a portion of the first inductor (L1) is disposed in a layer different from a layer including the second inductor (L2).

According to this aspect, it is possible to hinder the electromagnetic field coupling between the first inductor (L1) and the second inductor (L2).

In the directional coupler (10*b*) according to an eighth aspect, with respect to the fourth aspect, one of the first inductor (L1) and the second inductor (L2) is included in the semiconductor chip (60). The other of the first inductor (L1) and the second inductor (L2) is disposed at the substrate (50).

According to this aspect, it is possible to hinder the electromagnetic field coupling between the first inductor (L1) and the second inductor (L2).

The directional coupler (10; 10*a*-10*f*) according to a ninth aspect, with respect to the eighth aspect, further includes a third output terminal (311) and a third inductor (L1). The third output terminal (311) is configured to output a detection signal from outside. The third inductor (L1) is provided in a third signal path (R1) including the third output terminal (311). The semiconductor chip (60) further includes the third inductor (L1).

According to this aspect, it is possible to hinder the electromagnetic field coupling between the first inductor (L2) or the second inductor (L3) and the third inductor (L1).

In the directional coupler (10*g*) according to a tenth aspect, with respect to the fifth aspect, one of the first inductor (L3) and the second inductor (L1) is included in the semiconductor chip (60). The other of the first inductor (L3) and the second inductor (L1) is disposed at the substrate (50).

According to this aspect, it is possible to hinder the electromagnetic field coupling between the first inductor (L3) and the second inductor (L1).

The directional coupler (10; 10*a*-10*f*) according to an eleventh aspect, with respect to the first, third, fourth, sixth, seventh, eighth, or ninth aspect, further includes a switch (6). The switch (6) has a first common terminal (601), a second common terminal (602), a first selection terminal (61, 62), and a second selection terminal (63, 64). The first common terminal (601) is configured to be coupled to the first output terminal (312). The second common terminal (602) is configured to be coupled to the second output terminal (313). The first selection terminal (61, 62) is coupled to the first sub-line (12, 13). The second selection terminal (63, 64) is coupled to the second sub-line (22, 23). The switch (6) has a mode in which the first common terminal (601) is coupled to the first selection terminal (61, 62), and the second common terminal (602) is coupled to the second selection terminal (63, 64).

According to this aspect, the directional coupler (10; 10*a*-10*f*) enables carrier aggregation.

The directional coupler (10*g*) according to a twelfth aspect, with respect to the second, third, fifth, sixth, seventh, or tenth aspect, further includes the switch (6). The switch (6) has a first common terminal (601), a second common terminal (603), a first selection terminal (61, 62), and a second selection terminal (65, 66). The first common terminal (601) is configured to be coupled to the first output terminal (313). The second common terminal (603) is configured to be coupled to the external output terminal (311). The first selection terminal (61, 62) is coupled to the sub-line (12, 13). The second selection terminal (65, 66) is coupled to an external input terminal (341, 342) for receiving the detection signal. The switch (6) has a mode in which the first common terminal (601) is coupled to the first selection terminal (61, 62), and the second common terminal (603) is coupled to the second selection terminal (65, 66).

According to this aspect, the directional coupler (10*g*) enables carrier aggregation.

The directional coupler (10*f*) according to a thirteenth aspect, with respect to any one of the first to twelfth aspects, further includes an attenuator (42, 43). The attenuator (42, 43) is coupled to the first output terminal (312) and the second output terminal (313). The attenuator (42, 43) is configured to attenuate at least one of the first detection signal and the second detection signal. The first inductor (L2) and the second inductor (L3) are provided in a signal path on the input side with respect to the attenuator (42, 43).

According to this aspect, the first output terminal (312) for outputting the first detection signal and the second output terminal (313) for outputting the second detection signal are included. This configuration enables the simultaneous output of the first detection signal and the second detection signal. Therefore, according to this aspect, it is possible to simultaneously output multiple detection signals.

A radio-frequency module (100) according to a fourteenth aspect includes the directional coupler (10; 10*a*-10*g*) according to any one of the first to thirteenth aspects and a filter (101-104). The filter (101-104) is coupled to the directional coupler (10; 10*a*-10*g*). The filter (101-104) is configured to pass a radio-frequency signal in a predetermined frequency band.

According to this aspect, because the directional coupler (10; 10*a*-10*g*) is included, it is possible to simultaneously output multiple detection signals.

A communication device (300) according to a fifteenth aspect includes the radio-frequency module (100) according to the fourteenth aspect and a signal processing circuit (200). The signal processing circuit (200) is coupled to the radio-frequency module (100).

According to this aspect, because the directional coupler (10; 10*a*-10*g*) is included, it is possible to simultaneously output multiple detection signals.

What is claimed is:

1. A directional coupler comprising:

a first main line;

a second main line;

a first sub-line electromagnetically coupled to the first main line;

a second sub-line electromagnetically coupled to the second main line;

a first output terminal coupled to the first sub-line, the first output terminal being configured to output a first detection signal corresponding to a first radio-frequency signal transferred through the first main line;

a second output terminal coupled to the second sub-line, the second output terminal being configured to output a second detection signal corresponding to a second radio-frequency signal transferred through the second main line;

a first inductor in a first signal path, the first signal path including the first output terminal;

a second inductor in a second signal path, the second signal path including the second output terminal; and a switch having a first common terminal coupled to the first output terminal, a second common terminal coupled to the second output terminal, a first selection terminal coupled to the first sub-line, and a second selection terminal coupled to the second sub-line, wherein in a first mode, the switch is configured to couple the first common terminal to the first selection terminal, and to couple the second common terminal to the second selection terminal.

2. The directional coupler according to claim 1, further comprising:

a first capacitor or a first switch coupled between the first signal path and ground; and a second capacitor or a second switch coupled between the second signal path and ground.

3. The directional coupler according to claim 1, further comprising:

a substrate having a semiconductor chip including at least a portion of the first main line, the second main line, the first sub-line, and the second sub-line;

a first electrode at the substrate, the first electrode being coupled to the first output terminal; and a second electrode adjacent to the first electrode at the substrate, the second electrode being coupled to the second output terminal.

4. The directional coupler according to claim 3, wherein the first electrode and the second electrode are at the substrate, and the first inductor and the first electrode overlap in a thickness direction of the substrate;

wherein the second inductor and the second electrode overlap in the thickness direction of the substrate; or wherein the first inductor and the first electrode overlap in the thickness direction of the substrate, and the second inductor and the second electrode overlap in the thickness direction of the substrate.

5. The directional coupler according to claim 3, wherein the substrate is a multilayer substrate including the first inductor and the second inductor, and wherein at least a portion of the first inductor is in a layer different from a layer including the second inductor.

6. The directional coupler according to claim 3, wherein one of the first inductor and the second inductor is in the semiconductor chip, and wherein another of the first inductor and the second inductor is at the substrate.

7. The directional coupler according to claim 6, further comprising:

a third output terminal configured to output an external detection signal; and a third inductor in a third signal path, the third signal path including the third output terminal, wherein the semiconductor chip further includes the third inductor.

8. The directional coupler according to claim 1, further comprising:

an attenuator coupled to the first output terminal and the second output terminal, the attenuator being configured to attenuate the first detection signal or the second detection signal, wherein the first inductor and the second inductor are in a signal path on an input side of the attenuator.

9. A radio-frequency module comprising:

the directional coupler according to claim 1; and a filter coupled to the directional coupler, the filter being configured to pass a radio-frequency signal in a predetermined frequency band.

10. A communication device comprising:

the radio-frequency module according to claim 9; and a signal processing circuit coupled to the radio-frequency module.

11. A directional coupler comprising:

a main line;

a sub-line electromagnetically coupled to the main line;

a first output terminal coupled to the sub-line, the first output terminal being configured to output a first detection signal corresponding to a radio-frequency signal transferred through the main line;

a second output terminal configured to output an external second detection signal;

a first inductor in a first signal path, the first signal path including the first output coupling terminal;

a second inductor in a second signal path, the second signal path including the second output terminal; and a switch having a first common terminal coupled to the first output terminal, a second common terminal coupled to an external output terminal, a first selection terminal coupled to the sub-line, and a second selection terminal coupled to an external input terminal and configured to receive an external detection signal, wherein in a first mode, the switch is configured to couple the first common terminal to the first selection terminal, and to couple the second common terminal to the second selection terminal.

12. The directional coupler according to claim 11, further comprising:

a first capacitor or a first switch coupled between the first signal path and ground; and a second capacitor or a second switch coupled between the second signal path and ground.

13. The directional coupler according to claim 11, further comprising:

a substrate having a semiconductor chip including at least a portion of the main line and the sub-line;

a first electrode at the substrate, the first electrode being coupled to the first output terminal; and a second electrode adjacent to the first electrode at the substrate, the second electrode being coupled to the second output terminal.

14. The directional coupler according to claim 13, wherein the first electrode and the second electrode are at the substrate, and the first inductor and the first electrode overlap in a thickness direction of the substrate;

wherein the second inductor and the second electrode overlap in the thickness direction of the substrate; or wherein the first inductor and the first electrode overlap in the thickness direction of the substrate, and the second inductor and the second electrode overlap in the thickness direction of the substrate.

15. The directional coupler according to claim 13, wherein the substrate is a multilayer substrate including the first inductor and the second inductor, and wherein at least a portion of the first inductor is in a layer different from a layer including the second inductor.

16. The directional coupler according to claim 13, wherein one of the first inductor and the second inductor is in the semiconductor chip, and wherein another of the first inductor and the second inductor is at the substrate.

17. The directional coupler according to claim 11, further comprising:

an attenuator coupled to the first output terminal and the second output terminal, the attenuator being configured to attenuate the first detection signal or the second detection signal, wherein the first inductor and the second inductor are in a signal path on an input side of the attenuator.

18. A radio-frequency module comprising:

the directional coupler according to claim 11; and a filter coupled to the directional coupler, the filter being configured to pass a radio-frequency signal in a predetermined frequency band.

* * * * *